United States Patent
Peterson et al.

(10) Patent No.: US 8,965,670 B2
(45) Date of Patent: Feb. 24, 2015

(54) METHOD AND SYSTEM FOR AUTOMATICALLY SELECTING AND DISPLAYING TRAFFIC IMAGES

(75) Inventors: Michael Peterson, Atlanta, GA (US); Deep Kalinadhabhotla, Atlanta, GA (US); Charles M. Link, Atlanta, GA (US)

(73) Assignee: HTI IP, L.L.C., Atlanta, GA (US)

( * ) Notice: Subject to any disclaimer, the term of this patent is extended or adjusted under 35 U.S.C. 154(b) by 1194 days.

(21) Appl. No.: 12/748,328

(22) Filed: Mar. 26, 2010

(65) Prior Publication Data

US 2010/0250369 A1  Sep. 30, 2010

Related U.S. Application Data

(63) Continuation-in-part of application No. 12/711,172, filed on Feb. 23, 2010, now Pat. No. 8,818,695.

(60) Provisional application No. 61/164,306, filed on Mar. 27, 2009.

(51) Int. Cl.
*G06G 7/76* (2006.01)

(52) U.S. Cl.
USPC ........ 701/118; 455/457; 455/556.1; 709/218; 701/117

(58) Field of Classification Search
USPC ............ 701/25, 446, 448, 117–118; 382/100, 382/206, 190, 209, 276, 282; 348/207.1, 348/231.99, 231.2; 707/758, 17.3, E17.03; 705/14.49, 14.58; 455/457, 556.1, 419, 455/414.1; 709/218
See application file for complete search history.

(56) References Cited

U.S. PATENT DOCUMENTS

| 5,164,904 | A | 11/1992 | Sumner |
| 6,728,631 | B1 | 4/2004 | Hessing |
| 6,747,692 | B2 * | 6/2004 | Patel et al. ................. 348/211.2 |
| 7,043,357 | B1 | 5/2006 | Stankoulov et al. |

(Continued)

FOREIGN PATENT DOCUMENTS

JP  2007058296 A  *  3/2007

OTHER PUBLICATIONS

Risk rank and emergency management of major hazard installations for highway tunnel construction; Hui Liu et al.; Emergency Management and Management Sciences (ICEMMS), 2011 2nd IEEE International Conf. on; Communication, Networking & Broadcasting ; Components, Circuits, Devices & Systems ; Computing & Process; published 2011 , pp. 228-231.*

(Continued)

*Primary Examiner* — Cuong H Nguyen

(57) ABSTRACT

Software, at a networked central computer or at a wireless mobile user device, uses GPS coordinates of a mobile user device's current location to determine a polygon in which the GPS coordinates lie. Upon determining the polygon that surrounds the current location, the software can perform a task related to the polygon. Examples of tasks include: determining traffic camera images to display on the mobile user device based on the location, speed, and heading of the user device. The images can include advertisements that pertain to the general vicinity, or demographics of those typically in the vicinity, of the cameras' coverage area. Another task includes associating performance data from a vehicle, and stored in a table, for a given location with a corresponding polygon that surrounds the location; processing the data; and assigning a risk value to the polygon based on the corresponding performance data.

15 Claims, 11 Drawing Sheets

(56) References Cited

U.S. PATENT DOCUMENTS

| | | | |
|---|---|---|---|
| 7,218,758 B2* | 5/2007 | Ishii et al. | 382/104 |
| 7,532,859 B2 | 5/2009 | Videtich | |
| 8,467,991 B2* | 6/2013 | Khosravy et al. | 702/153 |
| 8,494,498 B2* | 7/2013 | Kwon | 455/414.1 |
| 2003/0030445 A1* | 2/2003 | Baader et al. | 324/500 |
| 2005/0055727 A1* | 3/2005 | Creamer et al. | 725/105 |
| 2005/0099322 A1 | 5/2005 | Wainfan et al. | |
| 2005/0216302 A1* | 9/2005 | Raji et al. | 705/1 |
| 2008/0255888 A1 | 10/2008 | Berkobin et al. | |
| 2008/0268876 A1* | 10/2008 | Gelfand et al. | 455/457 |
| 2008/0303693 A1 | 12/2008 | Link | |
| 2009/0015590 A1 | 1/2009 | Hara et al. | |
| 2009/0202102 A1* | 8/2009 | Miranda et al. | 382/100 |
| 2010/0250369 A1* | 9/2010 | Peterson et al. | 705/14.58 |
| 2012/0046819 A1* | 2/2012 | Agrawal et al. | 701/25 |
| 2013/0002883 A1* | 1/2013 | Creamer et al. | 348/164 |

OTHER PUBLICATIONS

Real time trajectory prediction for collision risk estimation between vehicles; Ammoun, S.; Nashashibi, F.; Intelligent Computer Communication and Processing, 2009. ICCP 2009. IEEE 5th International Conf. on; Communication, Networking & Broadcasting ; Computing & Processing (Hardware/Software); published 2009 , pp. 417-422.*

Towards supporting GPS-unequipped vehicles in inter-vehicle geocast; Bachir, A.; Benslimane, A.; Local Computer Networks, 2003. LCN '03. Proceedings. 28th Annual IEEE International Conference on; Topic(s): Comm., Networking & Broadcasting ; Computing & Processing; Digital Object Id.: 10.1109/LCN.2003.1243211; published 2003 , pp. 766-767.*

Intelligent driving diagnosis system applied to drivers modeling and high risk areas identification. An approach toward a real environment implementation; Quintero M, C.G. et al.; Vehicular Electronics and Safety (ICVES), 2012 IEEE International Conf. on Topic(s): Comm., Networking & Broadcasting ; Components, published 2012 , pp. 111-116.*

Evaluation of safety risks at railway grade crossings: Conceptual framework development; Samaranayake, P.; Matawie, K.M.; Rajayogan, R.; Quality and Reliability (ICQR), 2011 IEEE Inter. Conf. on; Engineering Profession ; General Topics for Engineers (Math, Science & Engineering) ; Power, Energy, & Industry App.; published 2011 , pp. 125-129.*

Real-time crash avoidance system on crossroads based on 802.11 devices and GPS receivers; Ammoun, S.; Nashashibi, F.; Laurgeau, C.; Intelligent Transportation Systems Conference, 2006. ITSC '06. IEEE Topic(s): Computing & Processing (Hardware/Software) ; Transportation; Published 2006, pp. 1023-1028.*

Research on safety driving assistant system of expressway on-ramp merging area based on wireless network communication Chen Rong; Li-Sheng Jin; Jin Yu; Machine Learning and Cybernetics, 2009 International Conf. on; vol. 6; Computing & Processing (Hardware/Software) ; Robotics & Control Systems; published 2009 , pp. 3139-3144• Towards Cong.*

Towards Congestion Detection in Transportation Networks Using GPS Data;Bazzani, A. et al.;Privacy, security, risk and trust (passat), 2011 ieee third international conference on and 2011 ieee third international conference on social computing (socialcom); published 2011 , pp. 1455-1459.*

Future vision distribution system and network; Sato, K. ; Katsumoto, M. ; Miki, T.; Communications and Information Technology, 2004. ISCIT 2004. IEEE International Symposium on; vol. 1; DOI: 10.1109/ISCIT.2004.1412853.*

"Yo G-Money!" Y(ireless) O(pen) G(PS-oriented advertised ways to make) Money!; Flynn, L. ; Vullikanti, R. ; Carvalho, M. ; Balakrishnan, R.; Wireless Personal Multimedia Communications, 2002. The 5th International Symposium on; vol. 3 DOI: 10.1109/WPMC.2002.1088368; Publication Year: 2002 , pp. 1197-1201 vol. 3.*

Learning and Recognition of On-Premise Signs From Weakly Labeled Street View Images; Tsung-Hung Tsai; Wen-Huang Cheng; Chuang-Wen You; Min-Chun Hu; Tsui, A.W.; Heng-Yu Chi; Image Processing, IEEE Transactions on; vol. 23 , Issue: 3 DOI: 10.1109/TIP.2014.2298982; Publication Year: 2014 , pp. 1047-1059.*

User-Based Attestation for Trustworthy Visual Sensor Networks; Winkler, T. ; Rinner, B.; Sensor Networks, Ubiquitous, and Trustworthy Computing (SUTC), 2010 IEEE International Conference on; DOI: 10.1109/SUTC.2010.20 Publication Year: 2010 , pp. 74-81.*

* cited by examiner

* OPTIONAL – COMBINED IDENTIFIER CAN ALSO INCLUDE DEMOGRAPHIC CODE VALUES

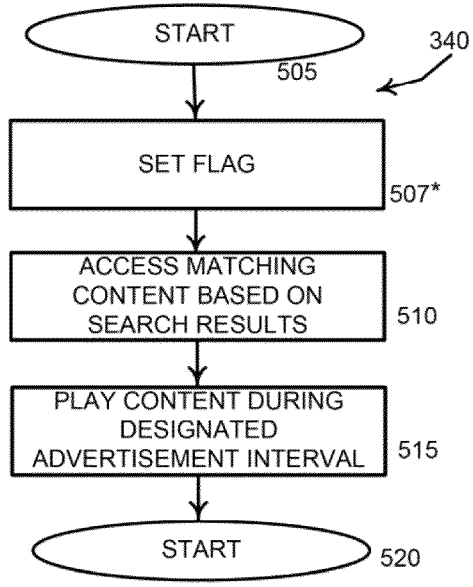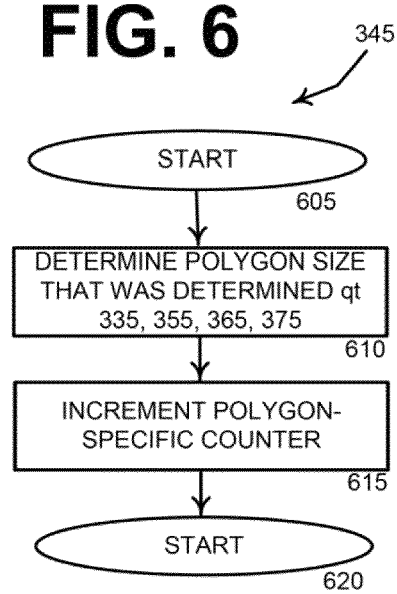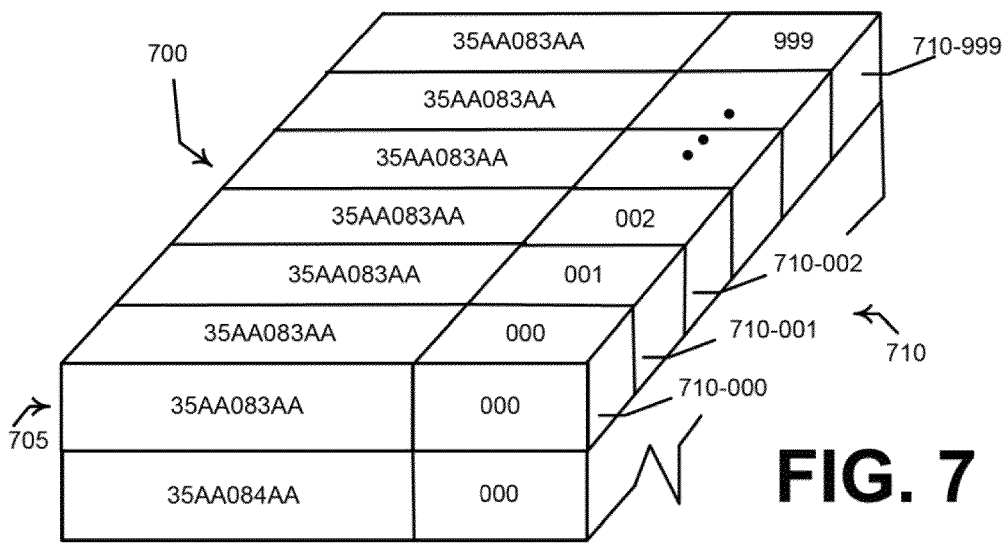

METHOD AND SYSTEM FOR AUTOMATICALLY SELECTING AND DISPLAYING TRAFFIC IMAGES

CROSS REFERENCE TO RELATED APPLICATION

This application claims priority under 35 U.S.C. 119(e) to U.S. provisional is patent application No. 61/164,306 entitled "Method and system for transmitting traffic images to a vehicle," which was filed Mar. 27, 2009, and which is incorporated herein by reference in its entirety. This application also claims priority under 35 USC 120 U.S. patent application Ser. No. 12/711,172 entitled "Method and system for providing targeted marketing and services in an SDARS network," which was filed on Feb. 23, 2010, and which is incorporated herein in its entirety.

FIELD

The present invention relates to telematics systems, and more particularly to performing tasks related to a geographical polygon surrounding the locations of one, or more, mobile telematics units, including automatically selecting and providing a driver with images of traffic along a route and assessing driving risk level for road portions.

BACKGROUND

Telematics refers to the integrated use of telecommunications devices and systems and information storage, usage, transmitting, receiving, and processing. More simply, telematics refers to sending, receiving and storing, information via telecommunication devices. In addition, telematics devices and system have been applied alongside Global Positioning System ("GPS") technology integrated with computers and mobile communications technology in automotive information and navigation systems.

Other than the convergence of telecommunications and information processing, the term telematics may also refer to automation of various services and processes relating to the driving and using of automobiles. For example, a telematics system can report emergency situations to a telematics services is provider's central location via a voice telephony call over a wireless communications network, or a message sent electronically over a network, including a wireless communications network and the interne. Telematics also includes services such as GPS navigation, integrated hands-free cellular telephony, wireless safety communications, and automatic driving assistance and information systems, such as traffic, restaurant, fuel, and vehicle diagnostic and emissions information. IEEE standard 802.11p refers to Wireless Access for the Vehicular Environment to facilitate and enhance Intelligent Transportation.

A telematics services provider ("TSP") typically operates a call center with live operators to respond to emergency calls and to contact the appropriate responders to the emergency. The TSP also typically has a telecommunications operations center ("TOC"), which typically includes a computer server and other networking equipment to connect the server with various networks, such as the internet. A telematics control unit ("TCU") installed in a vehicle, either at the time of manufacture, or after the vehicle was placed in service, typically contains a GPS portion, a cellular telephony portion, and general computer electronics such as a memory, a general processor, I/O interface, etc., which are coupled to the GPS and to the cellular, or wireless, telephony portion.

A subscriber typically pays a monthly services charge to a TSP. The TSP typically establishes and maintains a wireless services subscription with a wireless carrier, such as a cellular telephony services provider, so that the TCU can communicate with the TOC via wireless communication networks and the internet. This connection also facilitates Internet availability and functionality for a subscriber at the TCU. In addition, internet connectivity facilitates a subscriber transmitting and receiving information between his car and a personal computer, or other computer device connected to the Internet, either wirelessly or with a wired connection.

BRIEF DESCRIPTION OF THE DRAWINGS

FIG. 5 illustrates a flow diagram of a subroutine method for determining a content file to play.

FIG. 6 illustrates a flow diagram of a subroutine method for incrementing a content counter.

FIG. 7 illustrates a database record structure for associating multiple content files, or addresses thereof, with unique identifiers that correspond to desired polygons.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

An aspect may be embedded in a telematics control unit installed in a vehicle. In particular, an entire fleet of one, or more, manufacturer's vehicles may be equipped with the described telematics control units. In the ideal implementation of this invention, all system and subsystems of the telematics unit are contained within a single box, and controlled with a single core processing subsystem, but this is by no means the only implementation. Each of the is components of the telematics control unit can be separate subsystems of the vehicle, for example, the SDARS or AM/FM receiver can be a separate entity contained within the entertainment radio of the vehicle and the GPS can be a separate entity contained within the vehicle navigation system. The ideal embodiment would capitalize on the synergies of each of the electronics subsystems to minimize the VTUTMD cost and hence overall vehicle cost.

Figure 1:
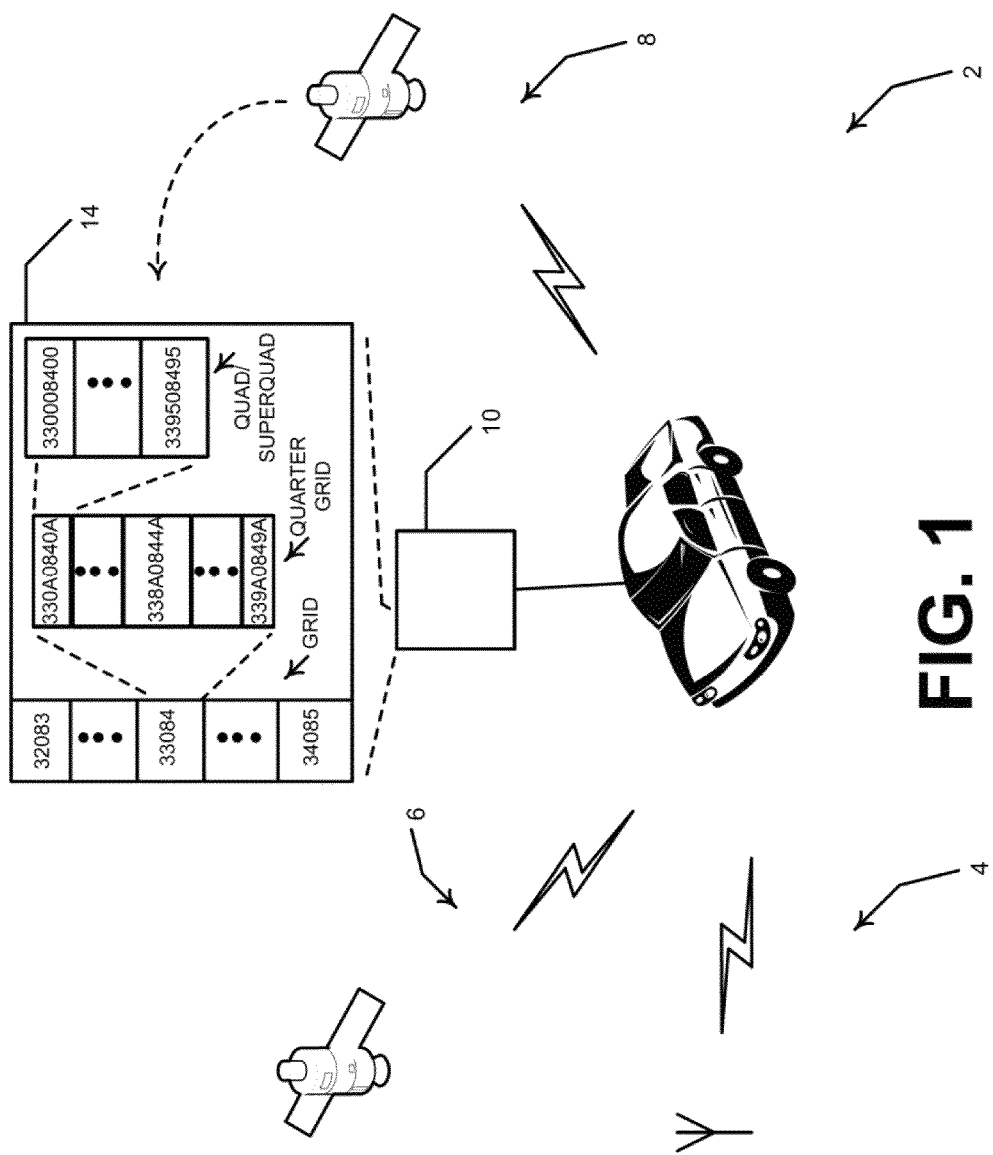
FIG. 1 illustrates the block diagram of a system for processing SDARS broadcasts.

The present application may refer to the device illustrated in FIG. 1 as a "vehicle telematics unit and targeted marketing device" ("VTUTMD"). Alternatively, this application may refer to device 10 as a vehicle telematics unit, or a telematics unit, or a wireless mobile device, which may be a cellular phone, a smart phone, a personal digital assistant, or other wireless mobile communication device. Referring to FIG. 1 above, system 2 includes three separate RF subsystems. The first subsystem is the PCS/Cell Modem network 4. Its typical purpose is for communicating crash information and perhaps other telematics functions, and is not required for the delivery of services by various aspects described in the present application. Network 4 can operate on any frequency available in the country of operation, and more specifically, in the U.S. markets, it could operate on the standard 850/1900 MHz cellular and PCS frequency allocations. The type of communications can be, but is not limited to, GPRS, EDGE, UMTS, 1xRTT or EV-DO. Alternately the modem could be a Wi-Fi or mobile WIMAX implementation that could support operation on unlicensed wireless frequencies. An aspect utilizes the central processor to control and operate the baseband wireless communications chips.

The second subsystem 6 includes a GPS receiver receiving position information from a constellation of satellites operated by the U.S. Department of Defense. Alternately the receiver could be a GLONASS receiver operated by the Russian Federation Ministry of Defense, or any other positioning device capable of is providing very accurate location information [LORAN, inertial navigation, etc]. In the preferred embodiment, this GPS receiver contains additional logic, either software, hardware, or both, to receive the Wide Area Augmentation System [WAAS] signals, operated by the Federal Aviation Administration, to correct dithering errors and provide the most accurate location possible. Overall accuracy of the positioning equipment subsystem containing WAAS is generally in the 2 meter range and contributes to the viability of the system. Optionally, the telematics solution can contain a MEMS, or piezo electronic gyro, or other angular rate sensor for measuring angular rates and wheel tick inputs for determining the exact position based on dead-reckoning techniques. This functionality is useful for determining accurate locations in the metropolitan urban canyons, heavily tree lined streets and tunnels.

In the preferred implementation, the third subsystem could contain an SDARS receiver or digital "In Band On Channel" [IBOC] AM/FM broadcast transmitter. SDARS utilizes high power satellites operating at 2.35 GHz to broadcast digital content to automobiles and some terrestrial receivers, and the signal is generally demodulated for audio content, but could alternately contain digital data streams that could be used to update the onboard databases contained within the VTUTMD.

Other solutions for providing database updates include using FM subcarrier, cellular data download, digital content on IBOC stations, other satellite technologies, or Wi-Fi etc. Though all would yield a satisfactory system, SDARS or IBOC data downloads provides the most flexibility and lowest cost by obtaining digital data through an existing receiver already installed for the purpose of audio entertainment. In the preferred embodiment, the SDARS data stream is typically not a channelized implementation (like AM or FM radio), but a broadband is implementation that provides a single data stream that is separated into the useful and applicable components. In the ideal implementation, a component of interest to the occupants of the vehicle is entertainment audio, traffic data, or weather data etc. However, an advertiser may also be interested in simultaneously extracting marketing area of interest database updates from the data stream. Additionally, using advanced coding techniques, IBOC digital radio supports multiple digital program channels within the bandwidth reserved for the single channel audio. Called "Tomorrow Radio", this and other similar techniques should demonstrate the feasibility of using an alternate source for targeted content delivery, to be stored and played back on request by the onboard processing system.

In the preferred embodiment, a processor inside the VTUTMD, or mobile wireless device 10 controls the various communications and position RF subsystems. In this implementation, the control processor would have attached SDRAM and FLASH memory containing the operating software and necessary high speed random access memory for containing temporary audio storage and scratchpad memory. This core processor can control additional peripherals within the VTUTMD for offering the highest integration while maintaining the lowest cost for the vehicle manufacturer. In this embodiment, the processing core controls the power to the components within the VTUTMD, shutting off GPS and SDARS receiver when the vehicle is inactive, and alternately turning off the wireless phone to conserve the vehicle battery when the vehicle is stationary for long periods of inactivity. In the preferred embodiment, the processor core controls the audio subsystem and contains a stereo codec and multiplexer for processing and presenting to vehicle occupants entertainment audio wireless communications audio (cell/PCS communications audio), speech recognition from the driver compartment for manipulating the SDARS receiver and cell/PCS phone dialing, and text to speech and canned audio for vehicle status annunciation. Additional communication with the driver for normal activities can occur through the infotainment radio head unit, which typically attaches to a vehicle's CAN (controller area network) bus.

The core processor normally monitors the accelerometers, or optionally communicates with the airbag deployment computer for crash notifications. The additional functionality of targeted marketing content delivery does not necessarily overburden the core processor. Ideally, the core processor will contain a real-time operating system, but could optionally contain a specialized task dispatcher, slicing the available bandwidth among the necessary tasks at hand, including wireless communications management, position determination and management, entertainment radio management, SDARS data demodulation and assessment, power control, and vehicle communications. In the exemplary system, Linux was used as a task dispatcher and provided near real time functionality.

In the normal deployment where the VTUTMD operates as a telematics unit, hundreds of thousands and perhaps as many as 5 million of the VTUTMD devices would provide a level of content delivery useful to a broad range of advertisers. Reasonable quantities can be attained after about two years if a single manufacturer equips all the vehicles in its fleet. Those quantities can be reached sooner if multiple manufacturers participate. Areas of interest are characterized and mapped with road, city and region polygons. Each of these areas of interest is broken into four point polygons (e.g., squares, rectangles, or trapezoids). Each VTUTMD can receive nationwide, or partial downloads based on database size, and the area of interest. In the exemplary system, the continental U.S. is divided into grid squares 1 degree latitude by 1 degree longitude. Each grid square measures approximately 70×50 miles. Each VTUTMD receives, from the digital broadcast stream, segment databases for at least nine grid squares. The VTUTMD determines its latitude and longitude via the GPS. Following the steps of a method described herein, VTUTMD can determine and store information related to a grid square containing the vehicle's location, and surrounding grid squares, north, south, east and west, and northeast, southeast, southwest and northwest, for a total of nine grid squares.

Knowing the desired, and surrounding, grid squares, the VTUTMD monitors the data stream and load of the nine applicable grid squares containing polygons of interest ("polygons") as necessary. Each of these polygons comprises one or more targeted marketing areas that are of interest to advertisers. Recognizing that that vehicles are not static and move about the US, the VTUTMD may only update the recognized "home" location once per interval. In the exemplary system, an interval of twenty one days allows a user to travel outside of his home area for a vacation. However, if the vacation stretches to more than twenty one days, the VTUTMD may download and store in a database data corresponding to a new set of applicable grids and begin scanning those data for polygons of interest. In the case of a vehicle traveling out of its normal home location, since it does not have a valid database for the new area, it will not start selective marketing until three weeks have elapsed. Accordingly, the database that receives updates every twenty one days may be referred to as a static database. Thus, the VTUTMD need not constantly update the polygon database. A special exception algorithm causes the VTUTMD to retrieve and update the initial database after three days instead of three weeks for a new deployment. It will be appreciated that polygons can correspond to segments of a roadway, in addition to shapes just generally relating to areas having points of interest.

In certain cases, it may be desirable to update the database more often for vehicles used for vacation travel, for example. In this case, the VTUTMD can download a special, dynamic database, that more frequently updates data and appends it to the standard database as necessary to provide local content for a traveler, such as traffic images, advertising, restaurants, attractions, hotels or other vacation destinations, for examples.

The VTUTMD merges the nine individual databases that comprise the static database covering a home base grid square, with the special, dynamic, database into a single active searchable composite database. The database contains as many entries as the regions have areas of interest. In addition, the database may contain polygons that correspond to segments of a road. Each polygon entry contains one or more demographic/audio tag combinations. A "wild card" entry allows all vehicles passing into the virtual polygon to have a more generic audio substitution.

Each broadcast containing targeted marketing technology may broadcast "demographic listener estimates" ("DLE"), or demographic codes, that estimate the demographics of a listener based on the broadcast content with which it is associated. Based on a DLE code; and the location of a VTUTMD, content, such as advertisements, can be inserted into the broadcast stream that targets the demographics of the listener. Furthermore, if the DLE does not match a specific message available for a given location, then a more generic message can be delivered to the listener. In lieu of the broadcast containing the DLE, a separate cross reference database can be downloaded to the VTUTMD that references the Channel Number (for satellite SDARS broadcasts), or receive frequency to determine the DLE. Since AM and FM receive frequencies are reused many times, the cross reference database may be a unique part of the appropriate grid square database and when a vehicle is traveling into a particular grid square, it can reference the DLE for that particular grid square corresponding to the receive frequency currently tuned.

An area of novelty described in the present application includes the database, storage and lookup methods, and the relative speed at which a potentially very large database can be searched with a modest processor in the VTUTMD to is determine which content to insert into a content stream. As an example, an aspect disclosed herein uses a Linux (Unix-like) operating system.

One feature of Unix, or similar, operating systems uses a set of "C" (the programming language) functions called "NDBM". NDBM functions use a simple hashing function to allow the programmer to store keys and corresponding data in data tables and rapidly retrieve them based upon the assigned key. A major consideration for an NDBM database is that it only stores simple data elements (bytes) and uses unique keys to address each entry in the database. Accordingly, the NDBM functions provide a fast, yet scalable, solution that small processors can process efficiently.

Figure 2:
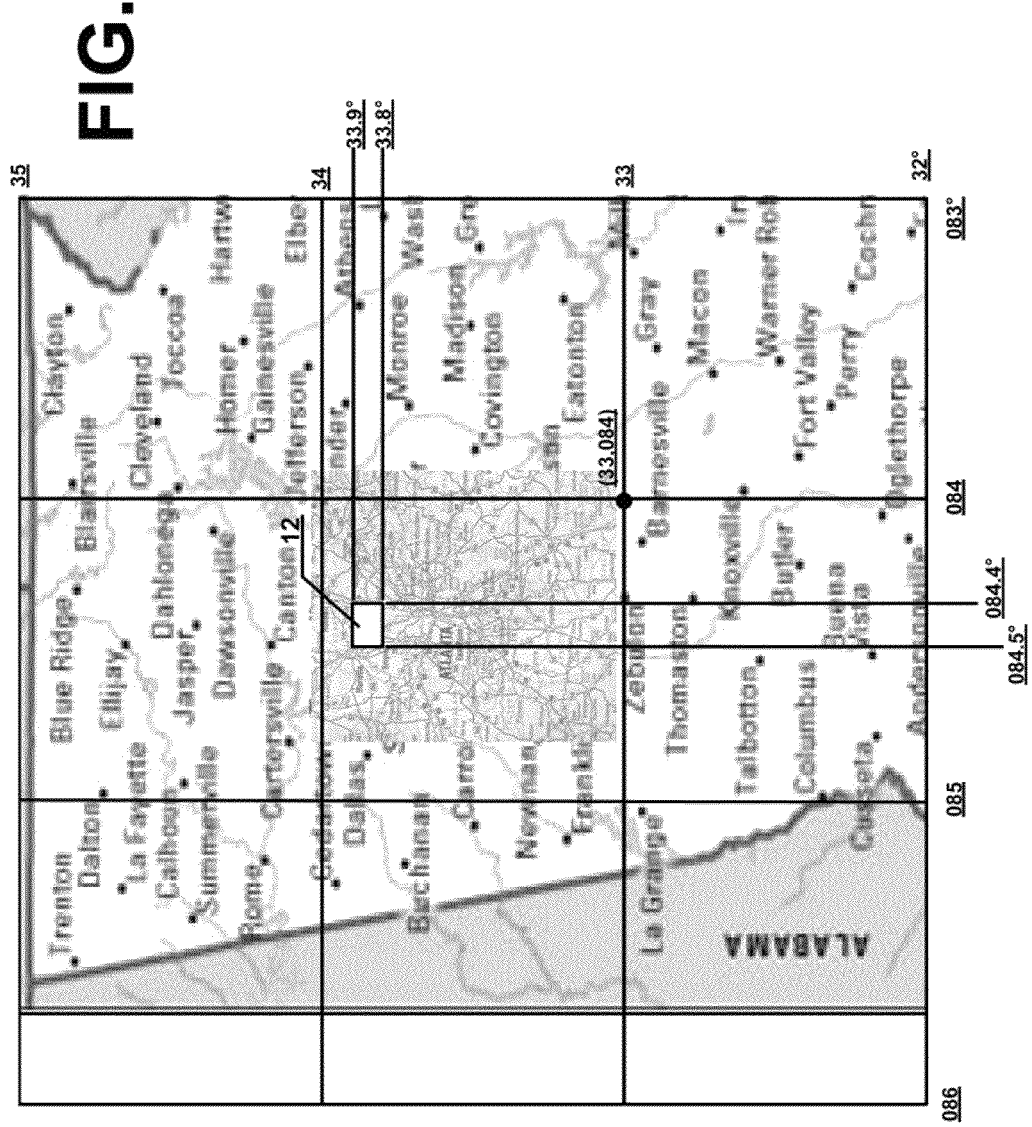
FIG. 2 illustrates an example map showing the coordinates of a quartergrid.

The databases are carefully crafted and organized before being downloaded into the VTUTMD. Based on the 1×1 degree grid square model, the continental U.S. consists of approximately 938 grid squares. Each grid square uses the name of its vertices in forming its name so it is easily identified for any lookup. As an example shown in FIG. 2, the grid square containing some portion of Atlanta, Ga. with an actual location of N33.86050 WO84.49288 has the vertices N33.0 WO84.0, N34.0 WO84.0, N33.0 WO85.0, and N34.0 WO85.0. One possible naming convention would name the grid square using all four corners of its vertices. However, since we used 1 degree grids, and each grid square starts on a whole number degree boundary, an aspect shortens the name of a grid square to the single coordinate of the most southern and most eastern vertex. Therefore, an aspect can refer to the center grid square in which the specified location in the example lies as "33084". This grid square covers an area of approximately 70×50 miles (depending on latitude), and a database record associated with the grid square via an identifier derived from "33084" includes information related to the corresponding grid square.

Since a vehicle could reside and normally pass though one or more of the center grid square boundaries, the VTUTMD also downloads and utilizes the database records of the grid squares adjacent to center grid square 33084. The adjacent grid squares are easily determined according to the steps of a method based on the name of the center grid square. Assuming x=33 and y=084, the algorithm may comprise x−1|y, x+1|y, x−1|y−1, x|y−1, x+1|y−1, x−1|y+1, x|y+1, x+1|y+1 where "|" denotes concatenation. Thus, according to this algorithm, the grid squares adjacent to the center grid square 33084 are 32084, 34084, 32083, 33083, 34083, 32085, 33085, and 34085.

VTUTMD 10 monitors an incoming datastream until the center grid square database records and the database records of grids adjacent to it have been received. Each database record is downloaded, stored and tagged according to the time and date by the VTUTMD 10 in non-volatile memory coupled to, or part of, the VTUTMD. VTUTMD 10 searches for special dynamic database data when the vehicle is traveling outside of the area defined by the nine previously captured database records. These special dynamic database records are identified in an aspect by the name of the grid square followed by "S". The 'S' identifies a special transient, or visitor's, content database record.

The database record for a grid square can contain data for polygons of interest (subsequently referred to as polygons) at three different levels. In an example shown in FIG. 2, polygon 12 has coordinates, 33.8, 084.4; 33.9, 084.4; 33.8, 084.5; and 33.9, 084.5. The southeastern most vertex, based on these sets of coordinates is 33.8N 084.4W. These coordinates are shown in the quartergrid record labeled 338A0844A, in table 14 in FIG. 1. Thus, polygon 12 may be named 338A0844A. Polygon 12 discussed above uses seven digits, but nine characters, to name it; its coordinates each include a digit to the right of the decimal point to provide reference to tenths of a degree, rather than just to the degree of the grid square in which it lies. Use of the character 'A' is discussed in more detail elsewhere herein.

For some rural areas of the country, there may be no polygons, or a minimum number of grid square polygons, which subsequently may be referred to herein as simply a grid. In the case where no polygons are of interest to advertisers, a downloaded database record may not contain advertiser information, or content, but nevertheless may be tagged with a time and date stamp for updating, tracking, and database structure purposes. In cases where a large area includes relatively few polygons, those polygons are presented and addressed directly in the composite database.

A grid can be subdivided into smaller square polygons, referred to herein as quartergrids, superquads, and quads. According to this naming convention, each grid may comprise four quartergrids (2×2), 100 superquads (10×10), or 400 quads (20×20). Dividing a grid's longitude and latitude by tenth of a degree, for example, would result in a superquad identified by its southeastern corner's latitude and longitude coordinates. The corresponding superquad database entry containing aforementioned mentioned GPS location with tenth of a degree granularity, or resolution, would be identified as 3380844 as discussed above.

Since the coordinates of superquad polygon 12 are given in tenths of a degree, the superquad is one one-hundredth of a grid making it approximately 7 by 5 miles. In the most urban areas where there may be many areas are of interest, a superquad can further be divided by four, or better put, a grid can be divided by 400, or to ½0 of a degree. In an aspect, this gives database entries the most direct unit of search, a quad, which is approximately 3.5×2.5 miles for polygon 12. A grid, or quad thereof for example, again is identified by its most southeastern corner, in this case 338008440. However, one aspect to consider when deciding to break down a grid for more granularity, and thus better relevance of content associated with a given grid, or subdivision thereof, is the fact that an area may be defined in the database record for each of the quads, superquads, or quartergrids. Since multiple descriptions of the same information in different records would tend to decrease the number of times a given advertisement would be played to a listener, an advertiser should decide whether the association of given advertisement content with a grid, quarter grid, or superquad, in addition to a quad, makes economic sense. For example, if an advertisement plays when a driver enters a given grid, that same advertisement may not play again when the driver enters a quad that the advertisement content is associated with until other advertisements also associated with the same quad plays, unless the advertiser pays extra for preferential treatment.

As another example, suppose that a vehicle is located in a very dense urban area called Alpha City. The home location of this vehicle is N044.65432 W115.73321. The urban area is ten miles by ten miles and lies in grid 44115. This grid contains many areas of interest, and thus corresponding polygons that are associated with these areas, points, or establishments, of interest, and thus has the database entries broken down into polygons identified as quads. As the vehicle travels north of Alpha City, there is only one road. That road is an interstate that runs straight through 45115. Grid square 45115 is interesting to advertisers so the database record corresponding to it contains multiple advertisement content corresponding to different advertisers. Directly to the northeast, grid area 46114 contains no areas of interest to the advertisers.

FIG. 7 shows an example of a subset of the database record 700 corresponding to the grid square containing the home location. Each grid's NDBM record is tagged, or associated with, a 9 byte key, or index value in an index field 705. The index is formed by taking the first two digits (the degrees) of the latitude (latitude values fall between 0 and 90, inclusive) and three digits of longitude is (longitude values fall between 0 and 180, inclusive) as shown, and combining them with a hexadecimal digit "A", or "B". This is done because the "A", or "B" does not represent a measure of degrees of either latitude, or longitude. Used as a placeholder so that all identifiers of polygons have the same number of characters as an identifier that represents the smallest polygon (i.e., highest resolution), an "A", a "B" (or other predetermined digit) provides uniqueness in an NDBM database when used to address, or identify, a polygon (superquad, quartergrid, or grid). Thus, the unique identifier for each polygon used as an index, or used as an indentifier in the index field of an NDBM database, contains the same number of characters as the unique identifier of other polygons, regardless of whether it represents a grid, quarter grid, superquad, or quad.

As an example, 35AA083AA represents, or addresses, data associated with a grid square having its southeastern most vertex at 35 degrees north of the Equator and 83 degrees west of the Prime Meridian. However, 350008300 represents, or addresses, a quad having its southeastern most vertex also at 35 degrees north of the Equator and 83 degrees west of the Prime Meridian. Thus, the presence of the placeholder "A" in places to the right of the whole number portions (i.e., 35 and 83) of the polygon identifier indicate the degree of resolution (in other words the size) of the polygon represented.

If the identifier does not contain any "A" characters, then the identifier represents a quad. If the last digit of either the latitude portion or the longitude portion is a "B", the identifier represents a superquad. If the last digit of either portion of the identifier is an "A", the identifier represents a quarter grid. If the last two digits of either portion of the identifier are both "A", then the identifier represents a grid. Alternatively, a "B" in the second place to the right of the decimal place could represent a quartergrid and an "A" in the same location could represent a superquad. Whatever character the method uses should not matter as long as the choice of characters distinguishes between coordinate values for superquads and quarter grids where the fraction portion for each corresponds to one half of a degree.

Furthermore, in an aspect, a polygon indicated by an identifier need not be symmetrical with respect to degrees or subdivisions thereof. A polygon need not be limited to one degree by one degree (a grid), one half of a degree by one half of a degree (quarter grid), one tenth of a degree by one tenth of a degree (superquad), or one twentieth by one twentieth of, a degree (quad). For example, the polygon identifier 35AA08300 would represent a polygon having width of one twentieth of a degree east to west, and one degree south to north, and having its most southeastern vertex at 35N 83W.

In another aspect, the portion of the location coordinate values representing fractions of a degree may comprise three digits rather than two, so that a southeastern vertex representing a superquad can have coordinate values with resolution of one twentieth of a degree, even though one tenth of a degree would define the length of a side of a superquad. A zero digit in the third digit of the fractional portion of a coordinate value could indicate a quad, but a "B" in the third digit could represent a superquad. For example, 35150084850 could identify a quad having its southeaster vertex at 35.150N 84.850W, whereas 3515308485B would correspond to a superquad having the same southeastern corner, or vertex. Although the same southeastern vertex would define both the quad and superquad, the superquad would have sides of one tenth of a degree but would be anchored by a southeastern corner having non-even number fractional coordinate values (i.e., 0.05; 0.15; 0.25; . . . 0.95).

Continuing with discussion of FIG. 7, database 700 uses field 710 to store one, or more, content addresses. However, it will be appreciated that the front value in index field 705 may be a hash of the string 35AA083AA000. The value behind it, as viewed in the figure, would be a hash of the string 35AA083AA001. The addresses can be IP addresses, or memory addresses of a location where a content file is located, stored either locally, or remotely on a remote server. The address in field 710 could also be any other way of identifying the location where the corresponding content, or data, is stored. Field 710 can be two (or more) dimensional, thus making a database including multiple records like record 700 function as a three-dimensional database, or table. If more the one content file is associated with a given geographical polygon (represented by the value in index field 705), then a separate content identifier represents each of the content files in the table as shown by the record blocks 710-000 through 710-999.

Figure 3:
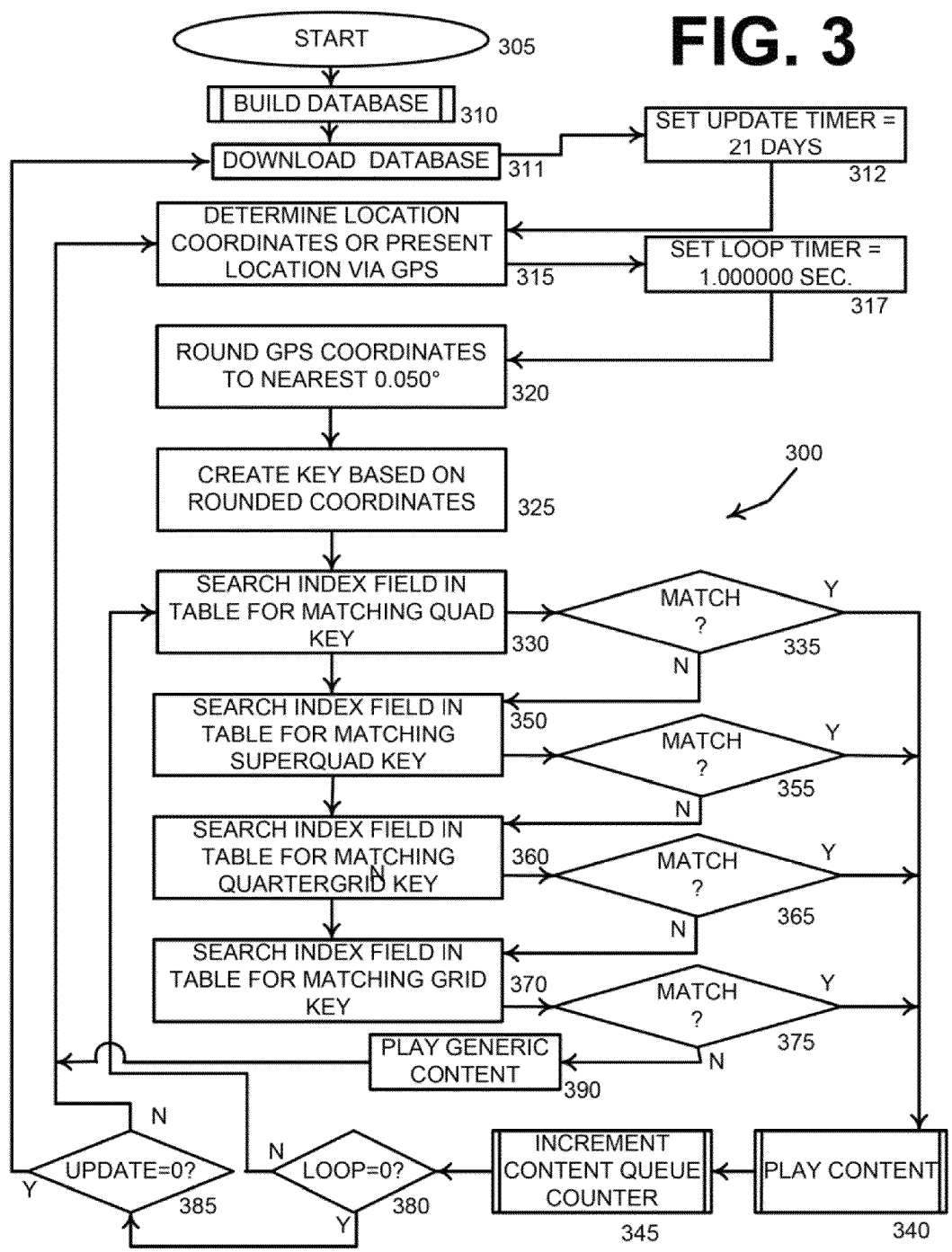
FIG. 3 illustrates a flow diagram off a method for playing content based on the location telematics unit.

Turning now to FIG. 3, the figure illustrates a method 300 running in a VTUTMD for playing content based on the location of a vehicle. Method 300 starts at step 305. An operator of method 300 builds a database at step 310. In building the database, method 300 typically associates advertiser content with a unique identifier, wherein the Method forms the identifier from a latitude portion and a longitude portion corresponding to the coordinates of the southeastern most vertex of a particular geographic polygon. As discussed above, the polygon may be a grid, a quarter grid, a superquad, or a quad.

An advertiser for a local restaurant may only want to associate a multimedia content file, an address thereof, or pointer thereto, with the identifier of a quad in which the restaurant is located. Or, the restaurant may want to pay more to associate his, or her, restaurant with the identifiers of the quad it is located in as well as the quads that surround it. On the other hand, an owner of a large chain restaurant may want to associate its advertising multimedia content file with an identifier of an entire grid that contains a large number of its restaurants.

Accordingly, method 300 associates an advertiser's content file, or a pointer thereto, with the identifier of a polygon. The identifier typically also includes a is content/data number portion, in addition to the latitude and longitude portion. For example, unless only one advertiser wishes to pay to associate an advertising file with a given polygon, each disparate value for the content number portion corresponds with a respective content file. In an aspect, the content number portion is a three digit number. Accordingly, up to 1,000 different content files could be associated with the identifier in the database table associated with a given polygon. Method 300 initializes a content queue counter to zero when it downloads data to build the database. As each content file is played to a driver during a predetermined period for playing advertising content, the method increments the content queue counter as described in greater detail below in connection with the description of step 345. Preferably, a hash algorithm processes the geographic coordinates and content/data number portion and stores them as unique identifiers, or search keys, into an NDBM database at step 310 to facilitate highly efficient searching thereof.

After method 300 has built a database at step 310, the method downloads database records to the VTUTMD at step 311 based on the coordinates of the VTUTMD's 'home' location, which may be the home address of the owner of the vehicle in which the TMD is installed. The database records downloaded at step 311 typically include static database records, as well as dynamic records if a driver of a vehicle having a given VTUTMD enters a geographical location that differs from his or home base. As discussed above, the dynamic database records would correspond to grids, and their subdivisions, surrounding a temporary location, such as a vacation location. If a VTUTMD remains in a 'temporary' location longer than a predetermined period, for example three weeks, the VTUTMD may deem the temporary location the permanent location and deem the dynamic database records as static records. Method 300 may set an update timer at step 312 to a is predetermined period, typically equal to a number of days or weeks. Method 300 may use the update timer to determine when to update the static portion of the composite database with new content. It will be appreciated that method 300 may update the dynamic portion of the composite database even if the update timer has not counted down if the VTUTMD enters a location outside the nine grid squares for which data related thereto composes the static portion of the composite database.

After setting the update timer at step 312, the method determines travel information, including the current location coordinates, current heading, and current speed, of the VTUTMD at step 315. Method 300 sets a loop timer at step 317 to a predetermined period used to determine when to acquire and process current location coordinates. Typically, the GPS portion of the VTUTMD can update the location coordinates once every second, so the loop timer may be set to equal one second. But, the frequency of transmitting updated information from GPS satellites, and processing speeds thereof at the user device 10, can vary either up or down. Furthermore, method 300 can direct that the VTUTMD perform the steps of method 300 at any predetermined interval. For example, a user may wish to set the loop timer value higher than one second to reduce processor load. Alternatively, method 300 can automatically cause the loop timer value to reset to different values at different times of the day, or week.

After the VTUTMD determines its location coordinates at step 315, and sets the loop timer, method 300 rounds the coordinate values down at step 320. In an aspect, when rounding down the values of the coordinates of the current location at step 320, method 300 typically stores the coordinates to four different memory portions each in a different format. For example, method 300 may designate a memory portion of the VTUTMD to store a value for use in searching for a matching quad in a future step of method 300. Since quads are one-four-hundredth is of a grid, as discussed elsewhere herein, a given coordinate value is rounded down to the nearest one-twentieth of a degree. Thus, the values for the latitude and longitude portions representing the southeastern most vertex of a quad would end in either "0.00" or "0.05" (or "0.000, or "050" if using three digits to represent the fractional portion of coordinate values as described above). Similarly, when processing the current position coordinates, along with an appended content/data number, according to the same hash routine used to build the database at step 310 for use as a search key in searching for a matching superquad identifier in the highly efficient database, method 300 rounds down the current position coordinates to the nearest tenth of a degree and places an "A" in the position that is two places to the right of the decimal point (position to the right of the whole number degree value of a coordinate value).

When method 300 converts the current location position coordinates and counter number into a search term for use in searching the composite database for a matching quarter grid, however, the method rounds the coordinate values down to the nearest half of a degree and places a B in the position two places to the right of the decimal point. Thus, identifiers in the database for a superquad will differ from entries from a quarter grid when the digit in a coordinate's position one place to the right of the decimal place is a "5." For example, 345A0835A would represent a superquad and 345B0835B would represent a quartergrid, where each polygon has its southeastern most vertex at 34.5N and 083.5W.

Finally, when method 300 converts and stores the current location position coordinates at step 325 for use in searching for a matching identifier in the database corresponding to a grid square, the method places two "A" characters, or "AA" to the right of the decimal point before storing the identifier to the corresponding memory portion designated for storing a grid-based search key, or is search string.

In the above discussion regarding converting the current location position information to a search string at step 325, method 300 rounds down. Thus, searching for a matching entry in the composite database will result in finding an entry that matches the polygon represented by values related to its southeastern most vertex in which the VTUTMD is located. In addition, the discussion above describes placing an "A" or "B" character in reference to a decimal. However, method 300 does not need to actually place a decimal character in the string it stores to the quad, superquad, quartergrid, and grid memory locations for use in comparing to corresponding polygon entries in the composite database. Reference is made to the location of a decimal for purposes of describing how to handle the identification of polygons of varying level's of precision.

Method 300 stores the rounded values to the corresponding memory portions at step 325. It will be appreciated that values stored in the plurality of memory portions may be stored in the same format that entry values for corresponding key values are stored in the index field of the composite database. For example, an operator of a VTUTMD, or a service provider that provides services through via a VTUTMD, may choose to use an NDBM database, where entries in the index field of the records in the database are the result of a hash algorithm performed on the identifier that comprises the current location coordinates and the filler character's, 'A', or 'B', as discussed above.

At step 330, method 300 retrieves the value stored in the quad key memory portion and appends a "000" to the quad key. It will be appreciated that the "000" could be appended after rounding but before storing at step 315. Further, it will be appreciated that after appending the "000", method 300 performs a hash function on the retrieved value (with "000" appended) using the same hash function that it used in step 310 to build the composite database, as will be describe in more detail elsewhere herein. Method 300 searches the index field of the composite database for a value that matches the quad key search term. Method 300 determines whether a match is found at step 335. If method 300 determines at step 335 that the composite database does not contain a match to the search term corresponding to the value retrieved from the quad key memory portion, the method advances to step 350.

If method 300 determines that a match (matching record) exists in the composite database at step 335, the method advances to step 340 and retrieves content from the composite database (or from a location pointed to by the matching record) that corresponds to the matching database record and plays it according to a subroutine method described in more detail herein. Alternatively, method 300 can perform some other action at step 340; for example, evaluating whether the current coordinate values lie within a polygon defined in the database, or in another database pointed to by the matching record. After playing the content at step 340, method 300 increments the content queue counter at step 345 according to a subroutine method described in greater detail herein.

At step 380, method 300 determines whether the loop timer has counted down. If the determination at step 380 is yes, method 300 advances to step 385 and determines whether the update timer has counted down. If the determination at step 385 is yes, method 300 advances to step 311 and the method repeats as described above.

If the determination at step 380 is no, method returns to step 330 and continues as described above. If the determination at step 380 is yes, method 300 advances to step 385. If the determination at step 385 is that the update timer has expired, method 300 returns to 311 and continues as described above. If the determination at step 385 is no, method 300 returns to step 315, and continues as described above.

Returning to the description of method 300 at step 335, if the method determines that the composite database does not contain a value in the index field matching the hashed result of the quad identifier, at step 350 the method retrieves the search term corresponding to the current value in the memory portion for storing the hashed value corresponding to the superquad representation of the current position of the VTUTMD. Method 300 compares the value retrieved at step 350 with the values in the index field of the composite database to determine if a match therein exists at step 355. If the determination at step 355 is yes, method 300 advances to step 340 and continues as described above. If the determination at step 355 is no, the method advances to step 360.

At step 360, method 300 retrieves the search term corresponding to the current value in the memory portion for storing the hashed value corresponding to the quartergrid representation of the current position of the VTUTMD. Method 300 compares the value retrieved at step 360 with the values in the index field of the composite database to determine if a match therein exists at step 365. If the determination at step 365 is yes, method 300 advances to step 340 and continues as described above. If the determination at step 365 is no, the method advances to step 370.

At step 370, method 300 retrieves the search term corresponding to the current value in the memory portion for storing the hashed value corresponding to the grid representation of the current position of the VTUTMD. Method 300 compares the value retrieved at step 370 with the values in the index, field of the composite database to determine if a match therein exists at step 375. If the determination at step 375 is yes, method 300 advances to step 340 and continues as described above. If the determination at step 375 is no, the method advances to step 390 and plays generic content, or performs some other action, before returning is to step 315 and continuing therefrom as described above.

Figure 4:
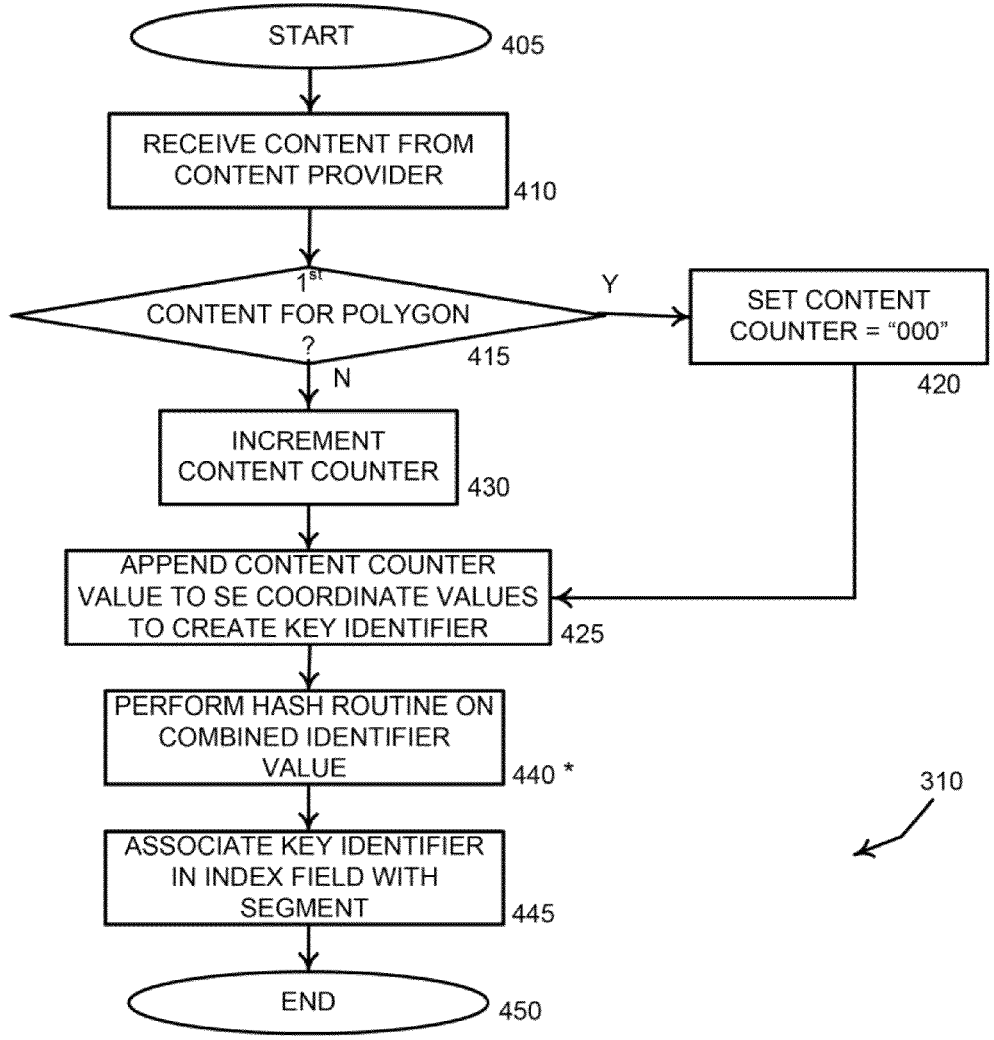
FIG. 4 illustrates a flow diagram of a subroutine method for generating database records for use in a method for playing content based on the location telematics unit.

Turning now to FIG. 4, the figure illustrates a flow diagram showing the steps of subroutine method 310 shown in FIG. 3. Method 310 starts at step 405 when called from step 310 in shown in FIG. 3. At step 410, a telematics services provider ("service provider") receives one, or more, content segments from an advertiser. The advertiser ("content provider") may push the advertisement content via the Internet to the service provider. Or, the content provider may transfer the content to the service provider via a computer disc, or other means. Along with a given content segment (e.g., an mp3 file for a fifteen second audio advertisement), the content provider will typically associate geographical coordinates of a particular polygon. The content provider may also associate a code, or codes, that indicates, or indicate, particular demographic characteristics.

At step 415, the services provider evaluates the polygon coordinates of the current content segment and determines (typically using a software program) whether it has received other content segments from content providers that have been associated with the same polygon. If the service provider has not received any other content segments associated with the same polygon, it appends the content counter value "000" to the current segments polygon coordinates at step 425. It will be appreciated that the content provider may have already inserted "A's", or "B's", to indicate the size polygon it wants to associate the current content with. If the content provider has not already inserted A's, or B's" (or other agreed-to characters that indicate polygon size), the content provider should have provided a size polygon it wants to associate the advertising content with. The service provider then creates the identifier of the polygon based on polygon coordinates, and the desired polygon size as requested by the content provider.

Returning to discussion of step 415, if the determination is no (service is provider has received content and associated it with the same polygon as the polygon requested for the current coordinates), the service provider increments the content counter at step 430 and method 310 advances to step 425, where it performs the step as described above. After performing step 425 one, or more, time, or times, the service provider has a database that associates a unique identifier with a content file, or another indicator that points to, or addresses, a content file. The service provider creates the unique identifier by appending the content counter value to the description (coordinates and size suffixes) of a polygon. In addition, the service provider appends any codes that indicate a particular demographic group to the polygon description. Thus, the unique identifier associated with a particular content segment file identifies a polygon location, the polygon's size, any preferred demographic group and the incremental sequence number assigned to content for the same polygon to distinguish the content from other content files associated with the same polygon. In addition, in another aspect, the service provider could achieve more than 1000 unique identifiers for content files within a given polygon by assigning content counter values 000 through 999 not only according to a particular geographic polygon, but also for each of a plurality of demographic codes for the given polygon. Thus, for a given polygon, for two different demographic code combinations, the service provider could associate 2000 content files with a given polygon.

After performing step 425, the service provider may optionally apply a hash algorithm to the identifier at step 440. Since the identifier resulting from step 425 could contain many characters (nine characters for geographical coordinates, three characters for content counter value, and more characters for one, or more, demographic codes, a hash result would typically result in fewer characters than the identifier itself, and thus would speed any search that a VTUTMD would perform, as discussed in reference to steps shown in FIG. 3.

Continuing with discussion of FIG. 4, at step 445, the service provider associates the unique identifier, either original identifier, or the result of performing the hash algorithm on the original identifier, with the corresponding content into a database record. Thus, the service provider typically maintains in a master database many database records that associate a unique identifier, which identifies a particular polygon, potentially a particular demographic group, and sequential number to distinguish between multiple entries for a given polygon and given demographic characteristics, with corresponding content. Thus, when a VTUTMD downloads static and dynamic database records at step 311 in FIG. 3, the VTUTMD receives all records from the master database that correspond to the home, and possibly temporary, locations of the VTU, and its owner's demographic characterization. Subroutine method 310 returns to method 300 at step 250.

Turning now to FIG. 5, the figure illustrates a flow diagram of subroutine method 340 of FIG. 3. Method 340 starts at step 505 and sets a polygon size flag at step optional step 507. The polygon size flag indicates which size of polygon the content to be played is targeted at. The flag is set at step 507 based on which of decision steps 335, 355, 365, or 375 from FIG. 3 returned a "Y", or yes, result.

Continuing with description of FIG. 5, method 340 accesses content matching the identifier in the index field from the "Y" match from steps 335, 355, 365, or 375. To access content, the method 340 directs the VTUTMD to access a content file corresponding to, a pointer in the record that resulted from the match at either of steps 335, 355, 365, or 375. The pointer could be an IP address, a memory address, or other such means.

The actual content file that corresponds to the matching pointer could reside on, or local to, the VTUTMD. Or, the content file could reside remotely at a server or other storage means accessible remotely from the VTUTMD via a wireless link from the VTUTMD. After accessing the content file, the VTUTMD plays the content file so the user can hear, and possibly see, the file content. It will be appreciated that the VTUTMD will play the content when a break in programming occurs. Typically, an audio, or video stream, broadcast, multicast, unicast, or other form, includes an indicator when an advertisement opportunity occurs. Subroutine method 340 ends at step 520 and returns to method 300 at step 340 as shown in FIG. 3.

Turning now to FIG. 6, the figure illustrates a flow diagram of a subroutine method 345 for incrementing a content counter. Method 300, shown in FIG. 3, calls subroutine method 345 at step 345. Subroutine method 345 starts at step 605 shown in FIG. 6, and determines at step 610 which polygon size was determined from steps 335, 355, 365, or 375 in method 300. As discussed above, this determination may be made at step 507 in method 340. If method 340 did not perform step 507, the operation at step 610 may be to do nothing; if step 507 was not performed, a generic message may have been played and thus a polygon size was not selected at either of steps 335, 355, 365, or 375. At step 615, method 345 increments a counter specific to polygon sizes. Thus, if a current value in a quartergrid counter is 134, and the most recent iteration of subroutine 340 played a content file corresponding to content counter field 710-134 in FIG. 7, for example, after a 'Y' result from step 365 in FIG. 3, then, method 345 would increment the content counter value for the quartergrid counter, so that the next time step 365 results in a 'Y', step 515 will play content addressed by a value in record 705 that identifies a quarter grid combined with a content counter value of 135 in 710-135 of table 705 shown in FIG. 7. However, if step 507 was not performed, an update to a polygon-specific counter would not typically occur. Method 345 ends at step 620 and returns to method 330 shown in FIG. 3 at step 345.

The following narrative illustrates use of a VTUTMD for inserting targeted marketing content. If a vehicle is parked in the home driveway of its owner and the VTUTMD is attempting to determine if the vehicle is in a targeted segment, the first step is to determine which quad the vehicle is in. The processor in the VTUTMD generates a trial key for the quad based on the GPS coordinates of the current location as shown in the following table:

| Latitude degrees | Rounded Latitude | Longitude degrees | Rounded Longitude | Key |
|---|---|---|---|---|
| 44.65432 | 4465 | 115.73321 | 11570 | 446511570 |

The key can be thought of as comprising a latitude portion and a longitude portion. The latitude portion being the rounded latitude value and the longitude portion being the rounded longitude portion. Before performing a lookup of the database record based on the key, they key may be concatenated with "000."

A lookup based on this key portion concatenated with "000" (the first record corresponding to the quad having a southeast coordinate of 44.65N 115.70W of the sequence) that yields no results indicates that no content has been associated with the polygon corresponding to these quad-level coordinates. Note that the coordinate values are rounded down to the nearest, and lower, 0.05 degree increment. It is noted that the key value references the quad address based on the addressing plan—referring to a rectangle based on the southeastern most vertex—discussed elsewhere herein.

Next, the processor searches to see if a superquad record exists. The processor in the VTUTMD then assembles a key based on the superquad format:

| Latitude degrees | Rounded down Latitude | Longitude degrees | Rounded down Longitude | Key |
|---|---|---|---|---|
| 44.65432 | 446 | 115.73321 | 1157 | 446A1157A |

This record is established using the values for each of the latitude and longitude coordinates rounded down to the nearest tenth of a degree and with an "A" appended to each coordinate value before concatenating the two groups together. This allows a lookup of a point in the database of a superquad polygon (in other words, a database record's index field value corresponds to a superquad-sized polygon).

Accordingly, it will be appreciated that a search preferably starts with the smallest increment of area, the quad, and progresses through a superquad search, then a quarter grid search, and finally a grid search. This allows associating content files with different sized polygons.

Each time a search is conducted for a key based on given geographical location coordinates and polygon size, the search begins searching the database at the beginning segment of each element; i.e., a hash result that is generated from the coordinates, polygon size indicators, and content counter number, which, as discussed above, preferably ranges between "000" and"999". The last search would preferably be at the grid level with the identifier (before appending a value 000 through 999) assembled as shown below:

| Rounded down Latitude | Filler | Rounded down Longitude | Filler | Key |
|---|---|---|---|---|
| 44 | AA | 115 | AA | 44AA115AA |

Based on the key generated concatenated with "000" (the first record of the sequence) (the actual NDBM key will be "44AA11.5AA000"), the processor addresses the composite database and reads a "0" record. This "0" is the first actual segment associated with the grid.

If the point does reside within the polygon, then the segment key, the polygon identifier, polygon vertices, as well as the DLE and audio segment identifiers, are locally stored for comparison to the DLE received from a currently tuned broadcast stream. If the stored DLE matches the received DLE, then the audio segment identifier identifies a possible audio segment to be played at the next identified insertion point. If the received DLE does not match the stored DLE, then the processor will continue searching the database by incrementing the counter from "000" to "001" to see if a possible match occurs. This allows an area is to have multiple demographic types to receive targeted audio content in the same location. Up to 1000 areas (from 000 to 999) are possible per polygon allowing extremely large granularity and large numbers of audio content. Further, with the flexible addressing of areas from a quad to a grid, relatively large areas can be accommodated. It is possible to have content that an advertiser wishes to reach a target within a grid, and stored and received DLEs do not match, but within the same grid, DLE codes stored in the VTUTMD (and thus may be used to generate unique identifiers in the composite database) matches content that an advertiser wishes to apply to a quad. If a quad-level content is not found by searching quad records, The VTU can play grid level content having a content value equal to the corresponding value currently set in the content counter (see step 615 in FIG. 6). Accordingly, the recursive search mechanism where the VTUTP searches until a match is encountered allows multiple levels of substitution for multiple demographic classes.

Figure 8:
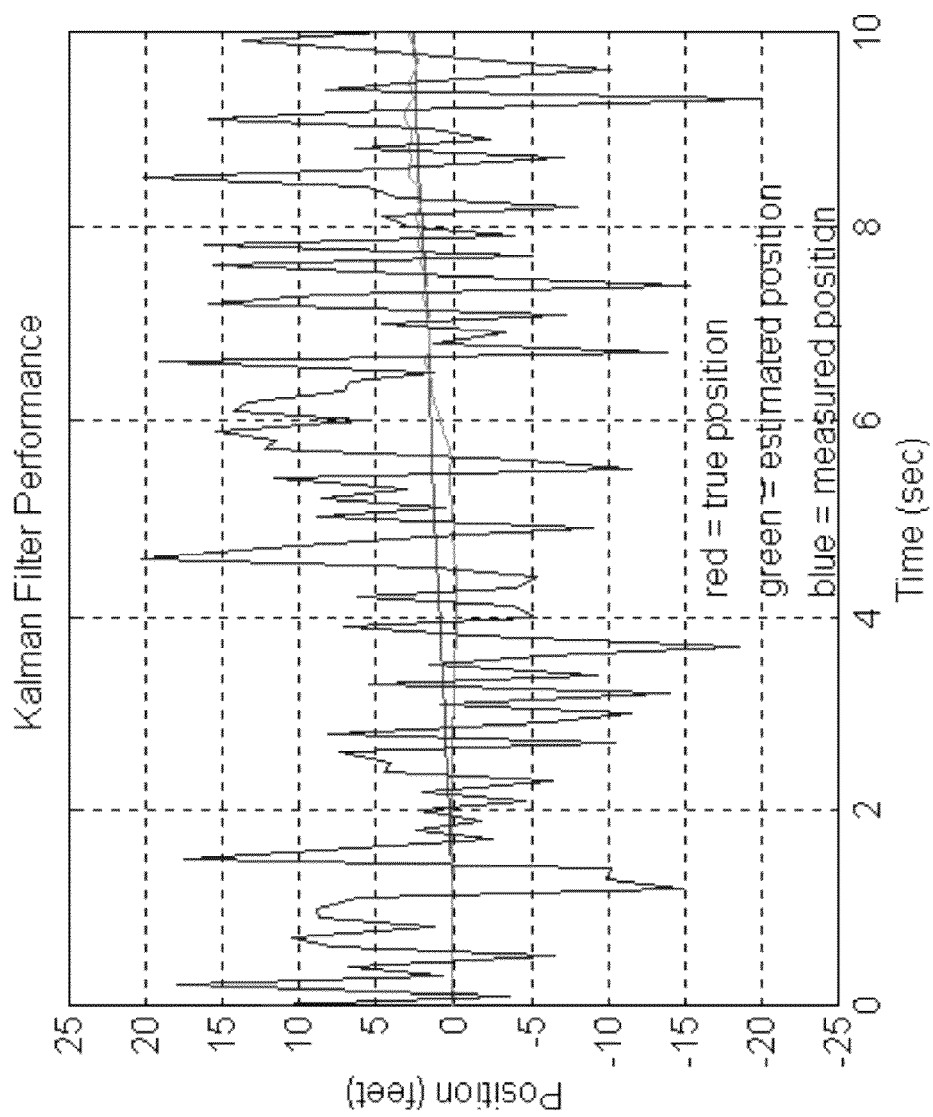
FIG. 8 illustrates a Kalman filter input versus output showing the processing step to stabilize the location of the vehicle using a WAAS equipped GPS.

The GPS resolves the vehicle position once per second and filters the position with a Kalman filtering algorithm, known to those skilled in the art and with outputs shown in FIG. 8.

Audio segments can be compressed audio or text messages that are verbalized using text to speech techniques. Audio segments can be distributed using various methods. Preferred methods include using the broadband data stream to using the alternate audio source as a feed from an IBOC. Any alternate source of audio can be considered and even analog audio sources that are digitized upon reception can be utilized. An example would be to use an analog FM subcarrier channel designed for distribution of alternate audio source, digitized and stored as digital audio segments for replay and insertion into an audio program. Using this technology does have the ability to deliver targeted DLE content for the primary audio channel. Recognizing marketing content (advertising) only occupies a small portion of the hourly content, a terrestrial broadcaster can subdivide his advertising content into many small targeted areas. Further, if implemented correctly, the FM subcarrier could deliver not only the content, but the queue indicating to the VTUTMD that a substitution is necessary.

Based on the preferred implementation, a VTUTMD could include an implementation that applies only to terrestrial or only to SDARS (satellite) or a combination of both. One aspect of interoperation is the queue signals that allow substitution of audio content, whether digitized audio or text to speech, this queue signal indicates the start of content and the length of the content so that the VTUTMD can anticipate the length of the message to be played. Using the methods demonstrated here, audio segment tags are assigned six digit numbers that are unique to a specific area of the country (it could be specific to a WalMart parking lot for example by using geographic subdivisions smaller than a quad, like a polygon that is one one-hundredth of a degree latitude by one one-hundredth of a degree longitude, or one ten thousandth of a grid. Even smaller subdivisions could be used for providing content to a user on a personal device while navigating through a shopping mall, or other public place with a high density of commercial establishments, or vendors.

Then once the vehicle, or individual, travels to the specified area, the audio segment identifier identifies the potential segments that may apply to this specific area. Upon first entry to the specified area identified by a change in the audio segment identifier, a content counter is set at "000". Multiple areas defined in the polygon database can identify the exact same audio segment identifier. In the exemplary system, a queue signal broadcast along with the digital audio stream identifies the DLE and length. The combination of the audio segment identifier "012223" plus the DLE "020" plus the length factor expressed as five second increments "012" (sixty seconds) plus a replay flag "000" is concatenated to a single index "012223.020.012.000". If no content exist using the index created, then the audio stream is unmodified from the main distribution. If content is located that corresponds to the indexed value, then the audio substitution will proceed. The replay counter is incremented by one. If the replay counter is incremented to a value other than "000" and no match is located for the audio substitution, then the counter is reset to zero. The index points to a specific audio message from a third message database that is also identified by a six digit field.

The combination of the data bases shall insure that audio content is available and if no content has been downloaded to correspond to the associated segment database, then the counter shall be reset to "000" and another VTUTMD will search for another segment. Recognize that the reception of audio segments generally will happen only during active drive time and the potential for missing specific targeted audio segments for specific DLE is high. This system depends on receiving audio data (segments) and caching those segments for replay at the appropriate time for the appropriate demographic. While it can provide reasonable replacement with "long running" advertisements, it does require some advance planning to allow substitution of content for a "short running" commercial. Certainly higher bandwidth distribution methods support themselves better than a to single low bandwidth digitized FM subcarrier, but as long as the single FM subcarrier is only trying to provide replacement content for the associated FM voice channel, the results would be acceptable. Further, with proper management, and limiting replacement content to a specific length say 60 seconds, carefully managing the distribution for specific demographics and managing the distribution to match the drive times of specific regions of the country, satellite audio sources can be very successful with audio substitution.

In another embodiment, in addition to defining a rectangular shape, like a grid or one of the previously discussed subdivisions thereof, a database record can also define a polygon that is not a parallelogram and that has more than four sides.

In view of the foregoing, it will be appreciated that the invention provides reasonable and acceptable method for adding local content to wide area broadcasts. Further, it should be recognized that although the preferred embodiment is to utilize equipment that may have been installed for other purposes, this technology could be developed and installed in a specially designed platform designed specifically for the purposes described. It should be understood that the foregoing relates only to exemplary embodiments of the present invention, and that numerous changes may be made therein without departing from the spirit and scope of the invention as defined by the following claims:

For example, the content, or data, pointed to by the record found by method 300 could include media content to play for advertising purposes. Alternatively, the data that a matching record points to could include the points of a polygon other than one of the four polygons already described (grid, quartergrid, superquad, and quad). If a polygon flag is set in the record, method 300 could perform a 'point in polygon' subroutine to determine if the polygon defined in the database record encompasses the current location of the VTUTMD. If so, method 300 may is determine an advertising content file to play based on a subroutine that plays advertisements' when the VTUTMD is within the polygon according to a frequency corresponding to how much an advertiser has paid for a a content file to be played. Alternatively, method 300 can report vehicle performance parameters according to predetermined parameter variable names stored as data in the record. For example, the data record could include variable names for speed, braking, acceleration, and location. The information corresponding to the variable names can be retrieved from a vehicle's onboard diagnostic system, from a CAN bus connection, from an OBDII port, or from other similar means for supplying vehicle diagnostic and performance information. After retrieving performance information from the vehicle, method 300 can transmit the performance information wirelessly to a central computer for processing. The central computer can process the received information for use in reporting and predicting current and future traffic conditions. For example, the central computer can synthesize the information from many vehicles in a given metropolitan area, for example, and report current traffic conditions to a given subscriber for a preferred, as well as for an alternate, route from point one location to another. Thus, rather than just viewing traffic conditions for major roadways from a helicopter and reporting them on a broadcast radio station every five to seven minutes, a subscriber can obtain instant and current conditions for all roads, rather than stale traffic condition information for roads he, or she, may not even plan to follow from one point to another.

In an aspect, the NDBM database has an index field, with the values in each of its records being a hashed version of coordinates describing a grid or subdivision thereof as described above, and perhaps an appended three digit value that provides the ability to associate multiple records with the same coordinates. Hashing the coordinates and the three digits provides a unique identifier.

The information associated with the unique identifier is preferably a data pointer, or number, or address, that points to a data record in a second database. This second database (the NDBM database being the first database) may not be an NDBM database, but instead a two dimensional table. The information associated with a record matching the data pointer may include points of a polygon (of any shape, not just rectangles), a polygon flag, and perhaps a content pointer, or address, that points to a record in a third database. The third database may also be a non-NDBM database table. Content associated with a given content pointer may include a content file, such as, for example, an .mp3 file that contains advertising audio, or an .mpg file that contains video. One skilled in the art will appreciate that the file types described herein can change over time. Indeed, over the course of the term of a patent that may issue based on this application, different forms of storing and retrieving content and data may exist that do not exist at the time of this writing. However, the basic concept of using a device's current location coordinates to form a search term, efficiently searching a database for content associated with the current location, and playing that content at a predetermined time, or periodically uploading performance information related to a vehicle, will work regardless of the means and methods for storing and retrieving information.

Figure 9:
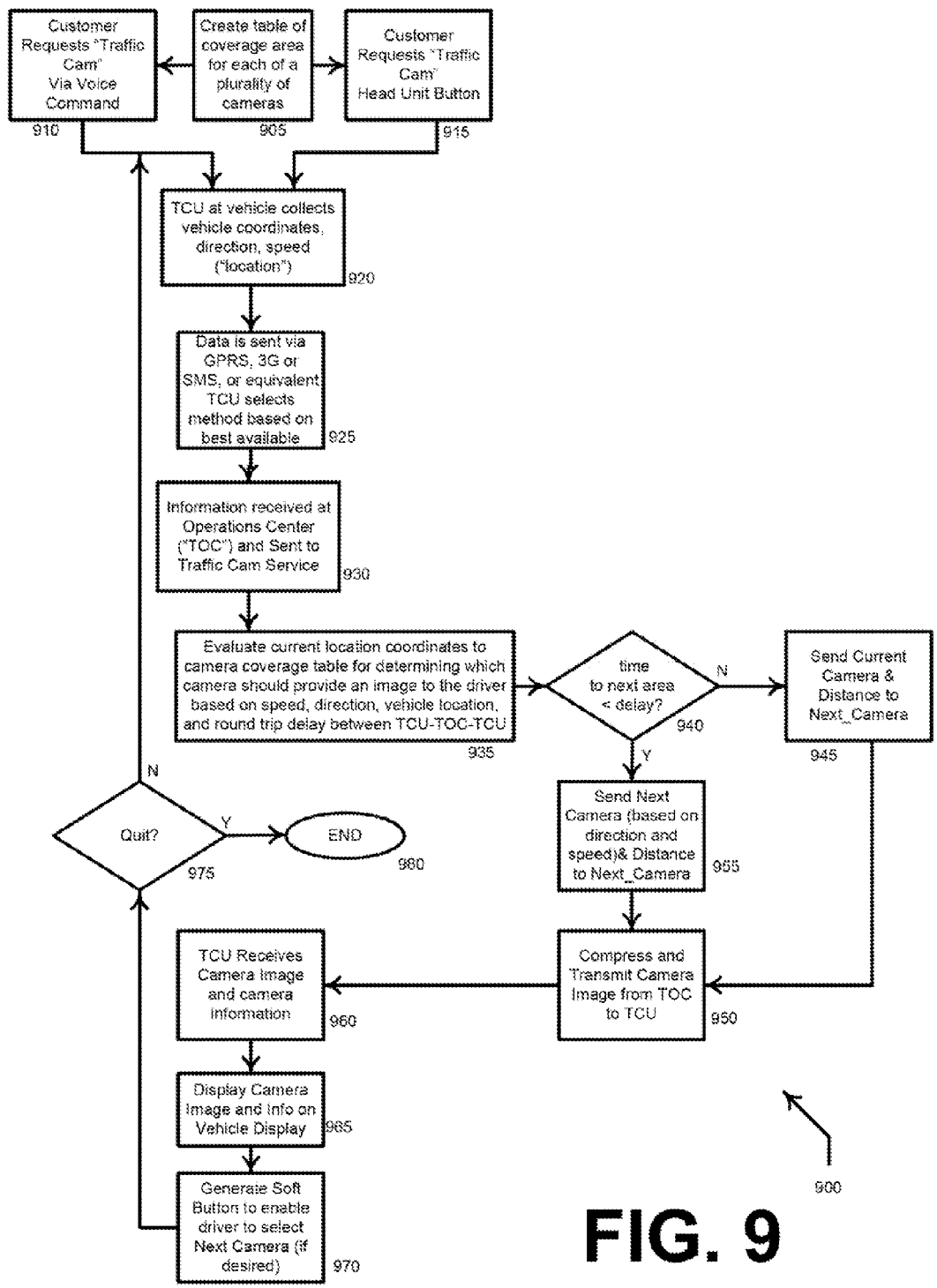
FIG. 9 illustrates a flow diagram of a method for automatically selecting and displaying an image from a traffic camera on a user device.

Turning now to FIG. 9, the figure illustrates a flow diagram of a method 900 for automatically selecting and displaying an image, or images, from a traffic camera on a user device. The device can be a PC or wireless mobile device. Preferably, however, a display coupled to a telematics control unit ("TCU") in a vehicle displays the image, or images, from the traffic camera. At step 905, a telematics operation center ("TOC") creates a coverage area table comprising records for each of a plurality of traffic cameras in a given geographical area. The coverage area may correspond to a plurality of polygons, as described above. Or, the cameras may correspond to polygons that do not necessarily have sides parallel to longitude and latitude lines. Typically, a software program running on a server at the TOC initiates the creation and storing of the table on a server that the TCU can access. Each record in the camera coverage table associates geographical coordinates, or polygons defined by geographical coordinates, with a traffic camera corresponding to the coordinates. A coverage area record in the coverage area table may include sets of geographical coordinates defining a polygon that describes the field of view of the corresponding camera. In addition to defining the field of view of a given camera, the coverage area record may include information describing a vector representing a directional component corresponding to the direction a camera points in. The geographical coordinates corresponding to a given camera may be used as, or as part of, a unique identifier identifying the camera. In addition, the table may also associate a default range with each corresponding camera. The camera coverage table may also associate image files from a given camera with the corresponding camera's geographical coordinates, polygon, or other identifier. Method 900 can then obtain and use a vehicle's current location (from a TCU or other user device moving with the vehicle) and perform a point in polygon operation to determine a polygon record based on the polygon the current geographical point of the vehicle lies in. Upon determining the polygon that surrounds the current location of the vehicle, associated camera files, or addresses to files, camera signal feeds, or links to the files, addresses, or feeds, can be forwarded to the wireless mobile device moving with the vehicle. Alternatively, method 900 can use the default range to determine whether a TCU is within, or will soon be within, the corresponding range, or field of view of a particular camera, as the vehicle follows a particular route.

At either step 910, or step 915, a user requests that a display in the vehicle he, or she, is driving displays the most relevant camera image, or images at the time of the request. The user may make the request using a voice command as shown at step 910, or via a user interface, such as a button, or graphical user interface, on a head unit of a vehicle as shown at step 915.

After the user requests the displaying of a camera image, or images, the TCU of the driver's vehicle collects the current geographical coordinates, and other travel information, of the vehicle at step 920. Typically, a TCU uses global is positioning satellite ("GPS") information to determine travel information, including location coordinates, speed, and direction/ heading. In addition, at step 920 the TCU may also acquires vehicle speed from the onboard diagnostic system of the vehicle. It will be appreciated that instead of a TCU fixed to a vehicle, a wireless mobile device, such as a cell phone, a smartphone, or other similar communication device may replace, and function in place of a TCU in the prior and following description of the figures.

At step 925, the TCU transmits the information it assembled at step 920 to the TOC. The TCU can select from a variety of technologies how to transmit the information to the TOC. For example, currently, a TCU may have the option to select from GPRS, 3G, W-CDMA, GSM, CDMA 2000, EVDO, CDMA, 1xRTT, among other currently known protocols and wireless transmission technologies. In addition, wireless service providers have signaled that they will use the 4G technology LTE within a few years. The TCU is programmable and thus can accommodate currently unknown future wireless transmission technology in communicating with the TOC.

At step 930 the TOC receives the information sent at step 925, typically via the internet, or similar network (the TCU transmits wirelessly and the wireless service provider routes the received wireless signal to the TOC via the interne). After receiving the information from the TCU at step 930, the TOC forwards the received information to a traffic camera service. The TOC may operate the traffic camera service, or another entity coupled to the TOC via the internet, may operate the traffic camera service. The traffic camera service evaluates the information received from the TCU at step 935.

It will be appreciated that examples of a traffic camera service may include a government department of transportation organization, or an organization's equipment, that operates and maintains cameras along ways it operates. A traffic camera service could also be a privately owned and operated network of cameras mounted on privately owned real estate, or on privately owned, or leased, structures along a way. For example, billboard owners and operators may agree to allow a camera operator to mount one, or more, cameras, to one, or more, of their billboards. The traffic camera service could interleave, or alternate, traffic images with advertising images that may relate to advertisers within the proximity of a given camera.

At step 935, software, either operated by the traffic camera service, the TOC, other centrally located computer, or software running on the TCU or wireless mobile device, processes and evaluates the information received from the TCU or wireless mobile device to determine which traffic camera should supply the image, or images, displayed on the TCU or other wireless mobile device. The software uses the current, and perhaps historical geographical coordinates of the TCU or wireless mobile device, as a reference. The software can determine which camera image, or advertising image, to use based on the TCU's or wireless mobile device's current location, heading, and speed. Or, the software can predict the location of the TCU or wireless mobile device along the desired route at a time in the future according to the current geographical coordinates corresponding to the TCU or wireless mobile device.

In an aspect, the information received from the TCU at step 930 includes a time stamp of the time the TCU sent the information, or $T_0$. Thus, the TOC, or traffic camera service, can compare the time stamp when the TCU transmitted the information at step 925 with the current time at the TOC. Assuming an equal time for return from the TOC to the TCU, the TOC can estimate the location of the TCU at the time $T_1$ it would receive a return message from the TOC. The TOC calculates this future location based on the TCU vehicle's speed, direction, and geographical location at $T_0$. Based on the geographical location at $T_1$, the TOC can search the coverage area table created at step 905 to determine the predetermined range of the camera that currently encompasses the TCU and the range of the next camera along the apparent path of the TCU.

Thus, as step 940, the TOC, or camera service, compares the geographical location of the TCU at $T_1$ with the range of the next camera along the path of the TCU. If the coordinates of the TCU at $T_1$ still fall within the range of the current camera, or within the range of a camera associated with a current polygon that surrounds the vehicle's coordinates, method 900 follows the "N" path to step 945. At step 945, the TOC assigns an image file to a message to send to the TCU. In the figure, method 900 names the message to transmit to the TCU Next_Camera. At step 950 the TOC compresses the image file from the range table associated with current camera's identifier and transmits the compressed image file to the TCU.

If the TOC determined at step 940 that at $T_1$ the range of the current camera would not encompass the TCU, method 900 follows the 'Y' path to step 955. At step 955 the TOC compresses the image file from the range table associated with the next camera's identifier and transmits the compressed image file to the TCU.

At step 960, the TCU receives the camera image from the TOC and decompresses it. This causes the in-vehicle display to display the image received in the Next_Camera message at step 965. At step 970, the TCU provides an option for the TCU to generate a user interface to request that the ICU cause the in-vehicle display to display the next camera image at step 970. Method 900 advances to step 975. If the TCU has received an input from the driver that he, or she, wishes to exit the camera image display application facilitated by method 900, after step 975 the method follows the 'Y' path to step 980 and ends. Otherwise, method 900 follows the 'N' path and returns to step 920.

Figure 10:
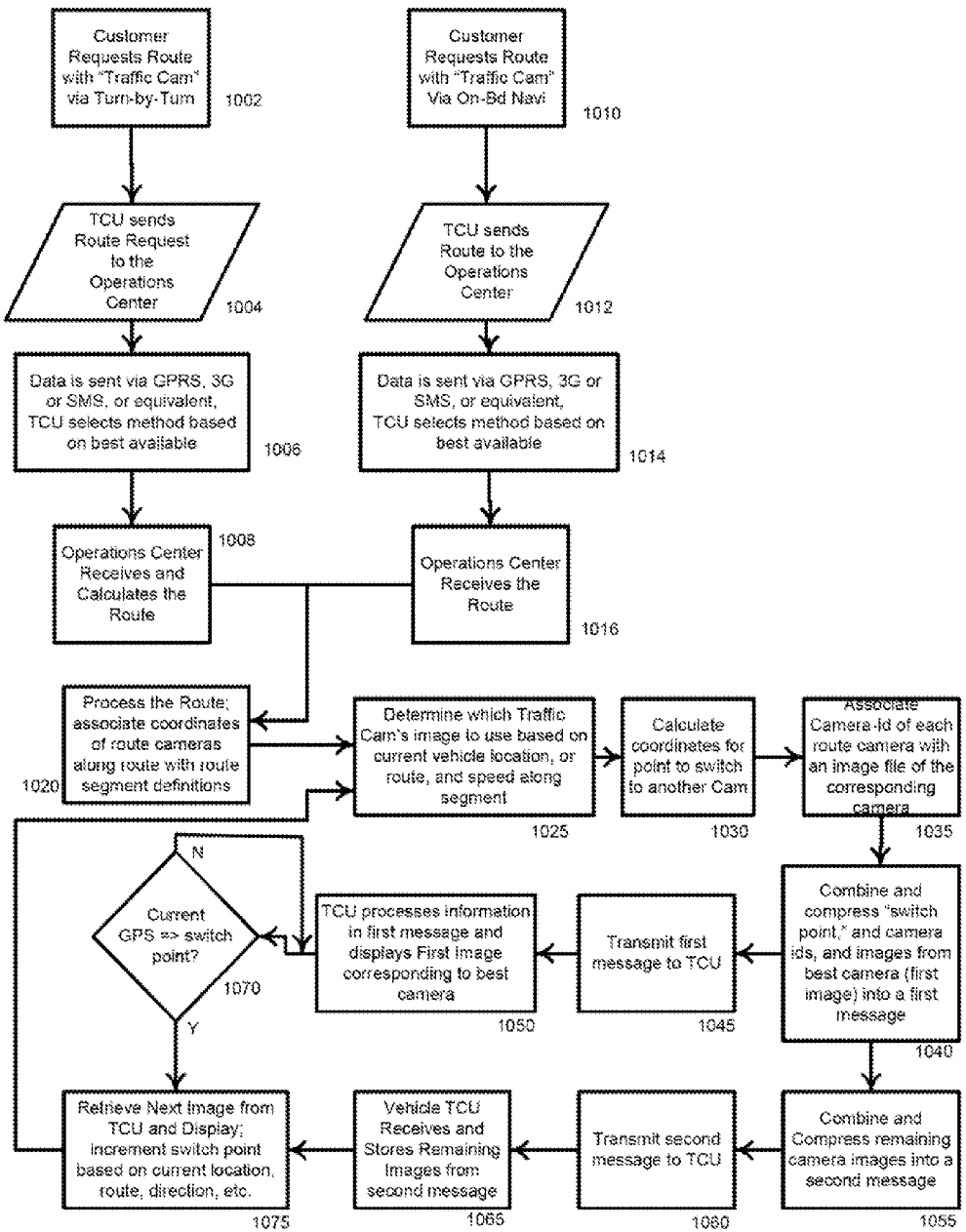
FIG. 10 illustrates a flow diagram of a method for automatically updating and displaying the most relevant traffic camera image, or images, on a user device display as a user travels along a route.

Turning now to FIG. 10, the figure illustrates a flow diagram of a method is 1000 for automatically updating and displaying the most relevant traffic camera image, or images, on a user device display as the user travels in a vehicle along a predetermined, or predicted, route. At step 1002, a user, typically a driver, of a vehicle having a TCU associated with it, can enter a route by requesting a turn-by-turn route between a beginning location and an ending location. Or, the user can turn on a bread crumb route creation application running on the TCU, or mobile wireless device, that creates a route by recording locations while the application is turned on. The bread crumb route creation application can record each polygon that the vehicle, associated with the TCU or wireless mobile device, enters and leaves while the application is activated. Experienced computer users may analogize this to turning on a 'record macro' button and then performing a task while the macro application records the steps the user initiates until the user turns off the record macro feature. The TCU prepares the request for transmission at step 1004 and transmits the route request to a TOC at step 1006 according to a transmission protocol and technology. For example, the TCU typically forms the request message into one or more packets and selects from a plurality of transmission techniques, including, but not limited to, GPRS, 3G, SMS, CDMA, GSM, W-CDMA, EVDO, 1xRTT, CDMA 2000, 4G, LTE, and other transmission techniques, protocols, technologies, and modulations, that may become used in the future. The TCU selects from the techniques it can support based on signal strength and other metrics that are favorable at the time of transmission. At step 1008, the TOC receives the route request that includes the beginning and ending locations, and calculates a route based thereon according to a predetermined algorithm. Or, the TOC receives coordinate values that define the polygons recorded by the bread crumb route creation application.

If a vehicle has a navigation system coupled to it, or a user, or driver, uses a portable mobile navigation system, the customer can enter a desired destination and the navigation system calculates the route between the current location of the TCU and the coordinates of the desired destination location at step 1010. At step 1012, the TCU forms the calculated route from the navigation system into a route message, typically comprising a packet, or packets, and transmits the route message to a TOC at step 1014 according to a selected transmission technique, as described in connection with step 1006. At step 1016, the TOC receives the route in the route message.

After obtaining a route at either step 1008, or step 1016, the TOC processes the received route information and associates cameras along the route with route segment definitions, polygon records, or identifiers, at step 1020. The route camera coordinates, identifiers, or associations of cameras with polygons the cameras relates to, may be created at step 1020 by requesting information from camera image providers, or, the TOC can use a camera coverage area table as described above with respect to step 1005 in the description of FIG. 9.

Continuing with the description of FIG. 10, in processing the route at step 1020, method 1000 causes the TOC to generate a set of route segment identifiers that correspond with the segments of the prior calculated route. These identifiers may be based on a starting coordinate of a road segment, or the coordinate values of coordinates that define a polygon. The TOC associates addresses, or identifiers, corresponding to various traffic cameras along the route with each of the route segment identifiers. For example, the TOC may perform this association of cameras with route segments, or polygons, according to geographical coordinates (latitude and longitude values) of a route segment's beginning and end points, and the geographical coordinates of each of the cameras along a route. In addition, the TOC may consider the orientation of a given camera and assign an orientation tag to the camera identifier. For example, a given camera pedestal, or stand, may have multiple cameras each aimed in a different direction. The TOC may append an 'S' to the identifier of a camera pointed in a southerly direction, an 'N' for one pointed in a northerly direction, etc. Thus, based on criteria predetermined by either a driver, or a default algorithm at the TOC, the TOC may forward an image from a camera with an 'S' tag if the driver is driving on a southbound lane of a road. Alternatively, if a driver is moving slow due to congestion, the driver may prefer to see an image from a camera pointing in a northerly direction to assess the cause and severity of the congestion. Accordingly, at step 1020, the TOC, associates, or assigns a camera image, or image feed, from camera locations along a route based on predetermined criteria with a corresponding route segment, or polygon.

At step 1025, the TOC determines which camera's signal to provide to a TCU for display by an in-vehicle display device. The TOC bases the determination at step 1025 on a number of factors, which may include current geographical location of the TCU (i.e., which road segment it is on, or which polygon it is bounded by), the route from either step 1008, or 1016, vehicle speed along the route, or segment of the route, time of day, weather conditions, as well as other factors. The TOC can associate a range value with a given camera identifier. A range value indicates a range with respect to a corresponding camera's geographical coordinates. Thus, the TOC can determine to transmit the signal from a given camera if its corresponding vehicle is within the predetermined range of the given camera, or will be within range of the camera by the time the TCU and in-vehicle display receives and displays a camera image, or images. In addition, to the TOC may use GPS heading information received from the TCU travel information to predict which option a vehicle will follow based on a match with one of multiple predetermined heading values that correspond with directions of multiple roads that emanate from an intersection polygon. An intersection polygon record may have the multiple heading values listed in records that correspond to the identifier of the intersection polygon's record in the polygon database. Thus, the polygon database may be multi-dimensional and thus can associated multiple camera addresses, identifiers, image files, or feeds, etc, with the corresponding multiple heading value corresponding to a given polygon identifier.

After determining the best camera for supplying an image, or images, to a TCU, the TOC may determine the 'switch point' along the route where the TOC should switch from transmitting an image from the current camera to transmitting an image, or images, from a different ("new") camera at step 1030. The TOC determines a switch point along a route based on the direction, speed of the vehicle, and range value of the current camera and of the next camera along the route path the vehicle is traveling. For example, if a vehicle is within range of a current camera, the TOC sends an image to the vehicle from the current camera. However, if the vehicle is traveling south along a route at sixty miles per hour, and the vehicle is 1,000 feet from the range value of the next camera when the TCU in it sends an updated coordinate and speed message to the TOC, the TOC may determine that the vehicle has passed a switch point. Thus, the TOC would send the image from the camera south of the current camera because the driver would find the image transmitted in its signal more relevant to traffic conditions than the one for the current camera. The TOC considers the trip time for the transmitting of a coordinate and speed message from the TCU, the time to process the message at the TOC, and the trip time for a message back to the TCU that includes an updated camera image. The processing time at the TOC is typically much less to (negligible in many cases) than the trip times to send messages back and forth between the TCU and TOC. The example given assumes a trip time between the TCU and TOC of about seven second in each direction, and assumes a round trip time of fifteen seconds. Thus, at sixty miles per hour, the vehicle will travel 1,230 in fifteen seconds, and may be within the range value of the next camera by the time the TOC sends an updated camera image to the TCU based on the most recently sent updated coordinate and speed message received from the TCU.

At step 1035, the TOC associates an image file from a camera signal with the corresponding camera's identifier, typically in a table stored at the TOC. At step 1040, the TOC composes switch points and the image from the best camera into a first message, typically in a compressed format, and transmits the first message to the TCU at step 1045. At step 1050, the TCU receives the first message, un-compresses the image from the first message and causes the in-vehicle display device to display the image for viewing by the user, or driver. Thus, the display device displays the best image, or image most relevant to the driver at the location corresponding to the most recent coordinates transmitted to from the TCU to the TOC while traveling along the selected route.

One skilled in the art will appreciate that the TCU, typically using a GPS receiver, periodically polls satellites and updates the coordinates of its current location. Many GPS receivers update once per second. At step 1070, the TCU evaluates its current coordinates by comparing with the switch point corresponding to the next camera received in the first message. If the TCU calculates that it is not within the range of the next camera's view, then method 1000 returns to step 1070. Method 1000 typically performs the evaluation at step 1070 once per second, or, the frequency that the TCU updates its GPS coordinates. If method 1000 determines at step 1070 that the current GPS coordinates place the vehicle outside the range of the current camera, the method advances to step 1075 and displays an image from the next camera sent from the TOC to the TCU in a second message.

Returning to discussion of step 1040, after composing the first message that includes the image from the current best camera, the TOC compresses an image from the next camera along the vehicle's current route into a second message and transmits the second message to the TCU at step 1060. The TCU receives the second message, un-compresses the image from the next camera, and stores it in a memory at step 1065. Then, at step 1075, after following the 'Y' path from step 1070, the TCU retrieves the image corresponding to the next camera and causes the in-vehicle display device to display the next image at step 1075. In addition, if the TCU memory contains sufficient memory, it can download multiple camera images from multiple cameras, and store the images in a polygon database that associates camera images with a polygon identifier. Thus, when the TCU detects that it has entered a given polygon, it can almost instantly display the corresponding image without having to request a message from the TOC. As wireless network available bandwidth increases and device memory capacity increases, such an aspect becomes more practicable.

After performing step 1075, method 1000 sends the TCU's current geographical coordinates to the TOC and returns to step 1025, and the TOC determines a new best camera and next camera and repeats the process as described above. It will be appreciated that a computer program that implements method 1000 can run completely, or partially, on a TCU, a wireless mobile device, as well as a TOC server. However, memory size, cost, and processor speed make performance of method 1000 on a centrally located server computer, like a TOC, preferable at the time of filing this application for patent.

Figure 11:
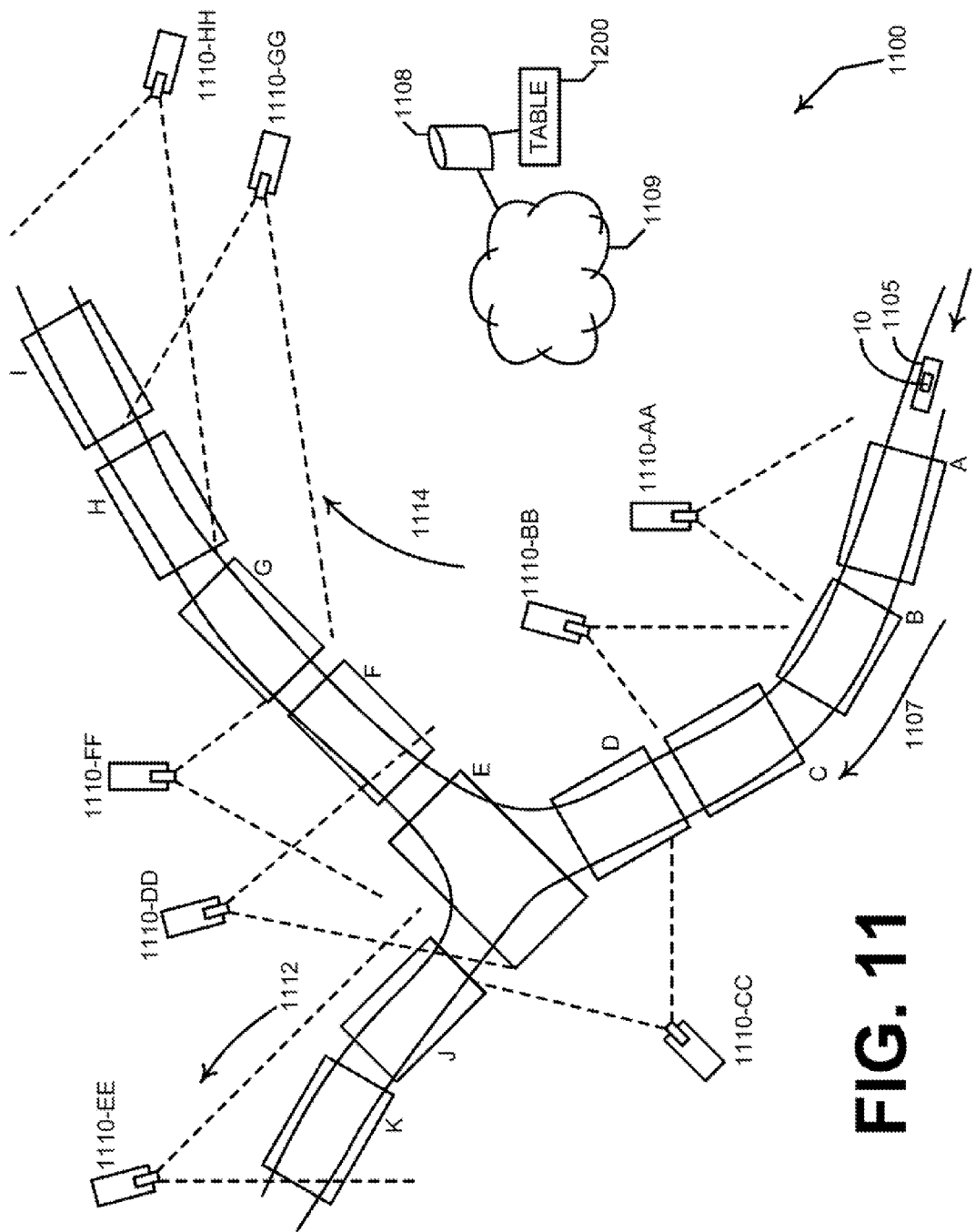
FIG. 11 illustrates a diagram of a system for automatically selecting and displaying relevant camera images based on the location of a vehicle.

Turning now to FIG. 11, the figure illustrates a system 1100 for automatically selecting one, or more, traffic images to display on a user device 10. User device 10 may be a wireless mobile device, or a TCU in vehicle 1105. Polygons A-D will surround vehicle 1105 as it travels in direction 1107. If vehicle 1105 transmits its travel information, e.g. GPS information, to a central server 1108 over communications network 1109, the server can then determine when the vehicle is within polygon A. It will be appreciated that network 1109 can include wireless networks, wired networks, the internet, local area networks, and other similar networks known in the art. As discussed above, user device 10 can communicate across, network 1109 according to multiple protocols and technologies to various devices, including server 1108, that couple to the network. When vehicle 1105 is within polygon A, server 1108 determines that images from cameras 1110-AA through 1110-EE are of interest to the driver, assuming he continues traveling in direction 1112. However, if the GPS travel information sent while vehicle is within the special intersection polygon E indicates a heading roughly corresponding to direction 1114, then central server 1108 assumes that vehicle 1105 has changed roads and is now traveling in direction 1114. If central computer 1108 determines that the car is traveling in direction 1114, then it updates the addresses corresponding to camera images, or identifiers associated with the cameras, or images there from, corresponding to cameras 1110-DD, 1110-FF, 1110-GG, and 1110-HH as cameras images that the driver of vehicle 1105 would like to see images from. Polygons A-D, F-G, J, and K are location polygons that only associate camera addresses, or identifiers with geographic location coordinates of a vehicle. However, polygon E is an intersection polygon, and relates not only location with camera information, but also heading with camera information. Thus, the central server user presence within polygon E, along with heading from GPS information from GPS circuitry in user device 10 in vehicle 1105 to predict whether the vehicle will follow direction 1112 or 1114. It will be appreciated that a tolerance may be assigned to the heading determination—the tolerance will typically be tighter the higher the number of roads emanating from an intersection polygon. Accordingly, server 1108 can automatically select the camera images to provide to vehicle 1105 depending on the direction the server predicts that the vehicle will follow based on the location and heading information received from the user device.

Figure 12:
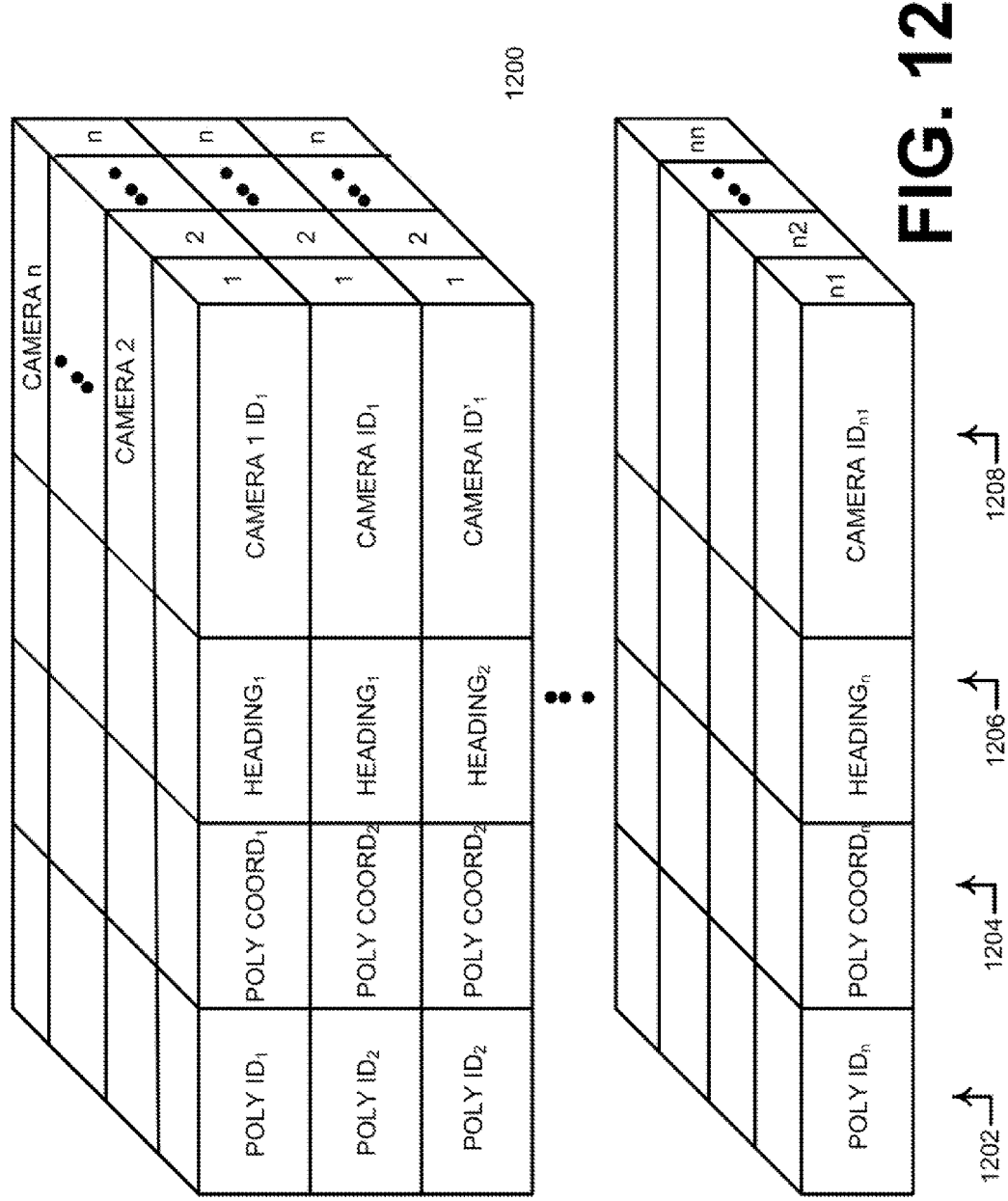
FIG. 12 illustrates a polygon database that associates polygons each surrounding a road portion with cameras that show images relevant to driving in a given portion.

Turning now to FIG. 12, the figure illustrates an exemplary section of a polygon database, or table, 1200. The table includes a field for a polygon identifier 1202. Table 1200 associates the identifier of a geographical polygon in field 1202 with the corresponding polygon's coordinates. It will be appreciated that the polygon identifier 1202 may comprise the coordinates that define it, so that a device's geographical coordinates can be compared to the identifier. Or, the coordinates that define a polygon can be included in a coordinate field 1204 for use in comparing to a device's coordinates to determine which polygon surrounds the device when it sends the coordinates to a central server. Table 1200 also includes a heading field 1206. This field may contain a null character to indicate that the corresponding polygon is designated as a location-only polygon. Or, the heading field may include a heading value that corresponds to a direction that a road takes from a road intersection that is bounded by the coordinates that define the corresponding polygon. In the figure, this scenario is illustrated by showing two different headings associated with the same polygon $ID_2$. Thus, the same polygon may be represented in multiple records if multiple road directions emanate from a road intersection that is bounded by the same special intersection polygon.

Table 1200 also contains a camera ID field 1208. Field 1208 can contain addresses (i.e. IP addresses, file names, URLs, links, or other network retrieval means) that provide images from the corresponding camera. Or, the camera field 1208 may contain an identifier that a user device, such as a TCU, can use to wirelessly request one or more images directly from the camera corresponding to the identifier infield 1208. Or, field 1208 can contain an actual image or video file downloaded from the corresponding camera. Thus, a user device located in a given polygon can access recent image or video content from the camera identified in field 1208 corresponding to the polygon identified in field 1202 that corresponds to the user device's location and direction. Also, as shown in FIG. 12, table 1200 can associate multiple cameras with the same polygon. Thus, as shown in FIG. 11, a driver might be located in polygon A, in which case he would probably have an interest in seeing image from cameras 1110-AA, BB, CC, DD, and EE, assuming his predetermined route was in direction 1112 after the intersection surrounded by polygon E. When user device 10 in vehicle 1105 sends to TOC 1108 travel information containing location coordinates within polygon A, the TOC may determine that POLY $ID_1$ in FIG. 12 surrounds the vehicle's current location. If heading is a null character, then the TOC would send camera images (links, addresses, etc.) associated with POLY $ID_1$ to the TCU for display. Alternatively, the TCU could have already downloaded and stored the camera images automatically, since the TCU may be programmed with the camera identifiers located along a preferred route, such as a commute to work, for example. Also, some of the camera images associated with a given polygon and heading may be advertising images—the TCU may interlace the displaying of the advertising images with the displaying of the traffic camera images.

It will also be appreciated that the methods described above in connection with FIGS. 1-8 can be used to narrow a set of polygons within a vehicle's home location, so that the TOC, or other device, does not have to compare a vehicle's given coordinates to all polygons defined in table 1200, which could be thousands, or millions, in number, depending on how many cameras can provide images to a given user device.

In another aspect, the methods described above can be used to organize performance data uploaded from a TCU, or other wireless mobile device. If an organization has an interest in data from a fleet of vehicle, for example an insurance company or a governmental organization, the vehicles in the fleet can upload performance data, such as acceleration and speed, along with a polygon identifier that relates to a polygon that surrounds the vehicle's location at the time a device in it acquired the performance data. After it has acquired many samples of performance data from multiple vehicles, the central server can process the data and determine trends corresponding to a particular polygon.

For example, if performance data indicates a high number of samples of high braking forces from multiple vehicles in the same polygon, the interested organization can investigate roads that lie within the polygon. A government department of transportation may then decide that it needs to add signs, traffic control devices, or merely clear trees and shrubs to eliminate visual screens of traffic ahead. Or, an insurance company may decide to increase premiums for drivers that frequently drive in the polygon with a high number of hard braking events by multiple drivers.

Figure 13:
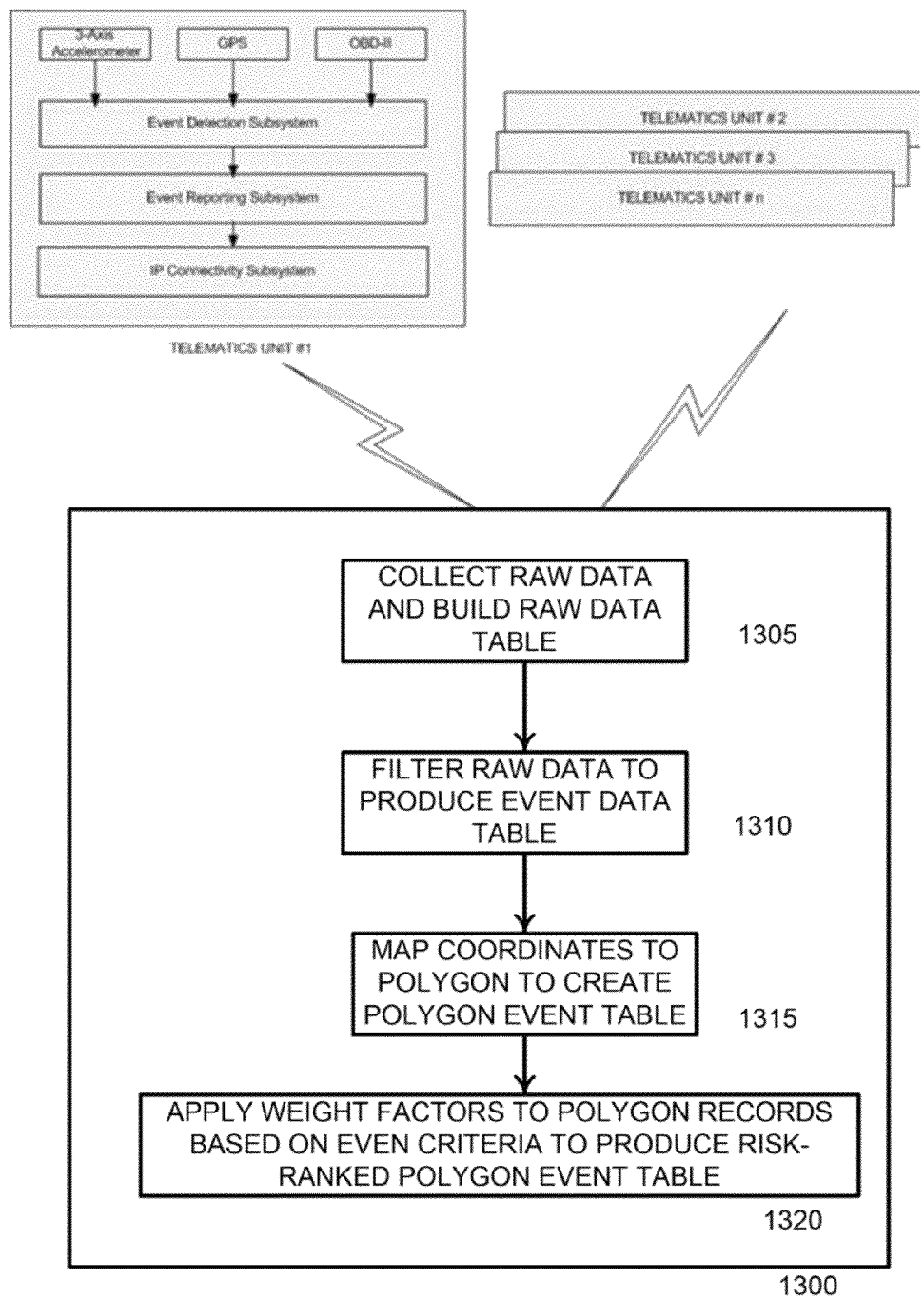
FIG. 13 illustrates a flow diagram of a method that processes data generated by multiple TCUs and weights the processed data according to driving risk assessment.

Turning now to FIG. 13, the figure illustrates system components and a method for determining an accident risk level of a road segment. A TCU in each of a plurality of vehicles acquires acceleration, speed, location and other relevant information in real time. As discussed above, the units can be equipped with one of many forms of IP connectivity to a back end, or central server. The central server typically includes a connection manager that facilitates and streamlines IP data transfer from various distributed telematics units (ICUs).

Software, hardware, or firmware (collectively the "risk assessment method 1300" or "method 1300") running either on a TCU, mobile user device, or a central server computer, processes received travel and performance information into a table of raw vehicle performance and location information at step 1305. At step 1310 risk assessment method 1300 filters records that do not meet a criterion, or criteria, such as an acceleration threshold, vehicle speed threshold, or the like, and stores the records that have met the criteria into an event data table. It will be appreciated that the criteria, or threshold, is typically a negative criteria inasmuch as 'meeting the criteria' means that a data value for a given parameter, like the acceleration a vehicle experiences, has a typically negative connotation when it exceeds the criteria or threshold. The higher the acceleration a vehicle experiences during an event, typically the more risk associated with the event. As shown below in table 2, the event data table resulting from performance at step 1310 leaves out records 2 and 5 as an example of the filtering process. At step 1315, method 1300 associates each event record with a polygon. A polygon may be selected to correspond to a given portion of a road way. Multiple sets (at least three) of latitude, longitude coordinate values may define a polygon where the coordinate value sets are the vertexes of the polygon. Thus, the coordinate value sets define a polygon that surrounds a corresponding road portion. Accordingly, method 1300 associates a record from the event data table with coordinate information contained in travel information provided from a GPS circuit of a user device. Method 1300 may associate the records with coordinates according to the result of performing a point in polygon algorithm by processing the latitude and longitude coordinates in the travel information with respect to the polygons in the event data table records. Performance of step 1315 results in a polygon event table. It will be appreciated that the event data table may also be filtered according to which grid, quarter grid, super quad or quad the user device lies in during performance of method 1300 to reduce the number of records processed at step 1315.

At step 1320, method 1300 applies weighting factors to each polygon represented in the polygon event table. For example, the polygon event table shown in Table 3 below illustrates that an event occurred twice in polygon 2. An even only occurred once in polygon 1. Thus, polygon 2, and thus a road portion surrounded by it, receives a higher risk ranking than polygon 1, as shown in Table 4. An example of this may be that a two vehicles generated an acceleration value higher than a threshold on a road portion in polygon 2, but did so only once on a road portion lying in polygon 1.

Typical TCUs and Tables 1-4 are described below.
Each of the TCUs typically include:
A 3-axis accelerometer to measure accelerations experienced
A GPS chipset to gather location information
An OBD-II sensor to collect vehicle related information like speed, steering angle etc.
An event Detection Subsystem
An event Reporting Subsystem
An IP connectivity stack (the stack is a general representation of technology-agnostic backend connectivity)
Event Detection Subsystem
This subsystem monitors conditions the TCU experiences and captures pertinent information when an event occurs.

Among other occurrences, an event can be any of the following:
A speed value above a threshold where speed is read from the GPS chipset and related circuitry or the OBD-II sensor.
A steering angle value received from the OBD-II sensor above a predetermined threshold.
A longitudinal acceleration value above a certain threshold where the acceleration value is measured from the 3-axis accelerometer. This acceleration typically indicates vehicle braking or forward acceleration intensity.
A lateral acceleration value above a certain threshold from the 3-axis is accelerometer typically indicates speed as a vehicle negotiates a turn.

Event Reporting Subsystem

On the occurrence of an event the event detection software notifies event reporting software. The event reporting subsystem captures various data when a corresponding event occurs. These data elements include:
Speed
Longitudinal Acceleration
Lateral Acceleration
Vertical acceleration
Steering angle
Location (Latitude and Longitude)
Time of Event (Timestamp)

These data elements are packaged and reported to a back-end central server through the IP connectivity stack.

IP Connection Management

This system aggregates event data elements at the central server from various TCUs. This subsystem collects the event information and enters it into a raw data base.

Data Processing and Analysis

An example of the data entries in the raw database appears below:

TABLE 1

Raw Data Table

|  | Speed | Y-Accl | X-Accl | Z-Accl | Turn Angle | Lat. | Long. | Time |
| --- | --- | --- | --- | --- | --- | --- | --- | --- |
| Record 1 | Speed 1 | Long. Accl1 | Lat. Accl1 | Vertical Accl.1 | Steering Angle1 | Lat1 | Long1 | Time1 |
| Record 2 | Speed 2 | Long. Accl2 | Lat. Accl2 | Vertical Accl.2 | Steering Angle2 | Lat2 | Long2 | Time2 |
| Record 3 | Speed 3 | Long. Accl3 | Lat. Accl3 | Vertical Accl.3 | Steering Angle3 | Lat3 | Long3 | Time3 |
| Record 4 | Speed 4 | Long. Accl4 | Lat. Accl4 | Vertical Accl.4 | SteeringAngle4 | Lat4 | Long4 | Time4 |
| Record 5 | Speed 5 | Long. Accl5 | Lat. Accl5 | Vertical Accl.5 | SteeringAngle5 | Lat5 | Long5 | Time5 |
| Record n | Speed n | Long. Accln | Lat. Accln | VerticalAccl.n | SteeringAnglen | Latn | Longn | Timen |

The raw event data from the above data base is then processed. The processing of the data consists of:

1. Data Filtering/Selection

Entries from the raw data table (example shown in Table-1) are selected based on (and not limited to) the following criteria and populated into the Event data table (example shown in Table-2):

a. If any of the individual axis acceleration values is greater than a pre-determined threshold; or b. If the magnitude of acceleration calculated from each of the individual components is greater than a pre-determined threshold In the example illustrated in Table-2, Event 2 acceleration measurements did not exceed criteria as determined by either of criteria a or b. Thus, the algorithm performing the risk ranking method filtered out, or blocked, Event 2 from the Event Data Table.

TABLE 2

Event Data Table

|  | Speed | Y-Accl | X-Accl | Z-Accl | Turn Angle | Lat. | Long. | Time |
|---|---|---|---|---|---|---|---|---|
| Event 1 | Speed1 | Long. Accl1 | Lat. Accl1 | Vertical Accl.1 | Steering Angle1 | Lat1 | Long1 | Time1 |
| Event 3 | Speed3 | Long. Accl3 | Lat. Accl3 | Vertical Accl.3 | Steering Angle3 | Lat3 | Long3 | Time3 |
| Event 4 | Speed4 | Long. Accl4 | Lat. Accl4 | Vertical Accl.4 | Steering Angle4 | Lat4 | Long4 | Time4 |
| Event n | Speedn | Long. Accl n | Lat. Accl n | VerticalAccl. n | Steering Angle n | Lat n | Long n | Time n |

2. Polygon Mapping

Location information in the event data table as shown in Table-2 is represented by latitude and longitude as obtained from GPS receiver. Each of the latitude and longitude are snapped to a polygon. The size of a polygon and the polygon to which a location coordinate belongs can be decided by predetermined but configurable criteria.

For example consider the following location co-ordinate (33.9455,−84.8845).

If the pre-determined size of the polygon is (0.1 deg×0.1 deg)/(11.1 Km×11.1 Km) and the polygon selection criteria is truncation of location coordinate values contained in received travel information then the above location would be snapped to (deemed to be located within) the polygon (33.9,−84.8).

If the pre-determined size of the polygon is (0.01 deg×0.01 deg)/(1.11 Km×1.11 Km) and the polygon selection criteria is to round up received location coordinates, then the above location would be snapped to the polygon (33.95,−84.89).

Polygon mapping produces a table in which location information for events is contained in the form geographic polygons. An example of a polygon event data table is shown below in Table-3. It will be appreciated that events 3 and 4 both occur within the geographic region bounded by the definition of polygon 2.

TABLE 3

Polygon Event Table

|  | Speed | Y-Accl | X-Accl | Z-Accl | Turn Angle | Loc. Polygon | ime |
|---|---|---|---|---|---|---|---|
| Event 1 | Speed1 | Long. Accl1 | Lat. Accl1 | Vertical Accl.1 | Steering Angle1 | Poly 1 | ime1 |
| Event 3 | Speed3 | Long. Accl3 | Lat. Accl3 | Vertical Accl.3 | Steering Angle3 | Poly 2 | ime3 |
| Event 4 | Speed4 | Long. Accl4 | Lat. Accl4 | Vertical Accl.4 | Steering Angle4 | Poly 2 | ime4 |
| Event n | Speedn | Long. Accl n | Lat. Accl n | Vertical Accl. n | Steering Angle n | Poly n | ime n |

3. Event Based Risk Ranking of Geographic Polygons

Each polygon is assigned a risk rank for each event. The risk rank is a weighted representation of (and not limited to) the following parameters:

Frequency of occurrence of events for a given polygon
Longitudinal acceleration
Lateral acceleration
Vertical acceleration
Steering angle
Vehicle speed collected by OBD-II sensor For example the risk rank for a polygon would be higher if Y-acceleration measured is higher than the Y-acceleration for another address (or polygon). If two polygons have the same number of frequency of events reported (were not discarded by the filtering process) then the calculated risk rank would be higher for the polygon with higher observed average vehicle speed.

In the example shown below, the table shows the result of ranking polygons based on the number of events that occur in the Event Data Table corresponding to a given polygon.

TABLE 4

Risk-Ranked Polygon Event Table

| Loc. Polygon | Event info | Risk Rank |
|---|---|---|
| Poly2 | Event 3, Event 4 | Rank 1 |
| Poly1 | Event 1 | Rank 2 |
| Poly n | Event n | Rank n |

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:

1. A method for displaying one or more images, comprising:
    associating a plurality of network retrieval addresses corresponding to a plurality of camera signal feeds with a plurality of geographical areas in an image table;
    processing travel information generated by a moving user device;
    determining an address of a camera signal feed, having one or more images corresponding thereto, based on the processed travel information;
    causing a display device to display the one or more images of the camera signal feed corresponding to the determined address and
    wherein the travel information includes geographical coordinates of the user device determined using GPS.

2. The method of claim 1 wherein the one or more images includes an advertising image.

3. The method of claim 2 wherein the advertising image is an image file associated with the address of the camera signal feed.

4. The method of claim 1 wherein the address is a logical address.

5. The method of claim 1 wherein the address is an internet address.

6. A method for displaying one or more images, comprising:
- receiving travel information from a moving use device corresponding to at least its current location, wherein the travel information includes geographical coordinates determined from GPS;
- comparing the geographical coordinates included in the received travel information to polygon records in a polygon database; determining a polygon record from the polygon database for which the boundaries of a corresponding polygon surround the geographical coordinates contained in the received travel information; and
- determining one of a plurality of logical addresses corresponding to one of a plurality of camera signal feeds corresponding to the determined polygon record; and
- displaying one or more images corresponding to the determined camera signal feed logical address.

7. The method of claim 1 wherein a traffic camera generates the camera signal feed.

8. The method of claim 7 wherein the traffic camera is mounted on or proximate to a billboard.

9. The method of claim 8 wherein a predetermined advertisement is associated with the traffic camera signal feed address and is displayed on the user device alternatingly with an image taken by the traffic camera.

10. The method of claim 1 wherein the determining an address of a camera signal feed corresponding to one or more images includes: comparing the geographical coordinates in the travel information to camera coordinates associated with the plurality of image records in the image table; and selecting an address of a camera signal feed that is associated with a camera having coordinates closest to the coordinates contained in the travel information.

11. The method of claim 6 wherein the image corresponding to the determined image address is an advertisement.

12. The method of claim 6, wherein the polygon database includes a quad field that lists a plurality of quad identifiers, wherein a given quad identifier is associated with a plurality of polygons each of which is defined by at least one point that lies within the associated quad, further comprising determining a quad in which the geographical coordinates lie and then performing the step of determining a polygon record from among polygons that are defined by the at least one point that lies within the quad.

13. The method of claim 6 further comprising determining from a plurality of heading records associated with the determined polygon record a heading record corresponding to a heading contained in the received travel information; and
- wherein the determining of one of a plurality of addresses corresponding to one of a plurality of camera signal feeds corresponding to the determined polygon record includes determining one of a plurality of addresses corresponding to one of a plurality of camera signal feeds corresponding to the determined heading record.

14. The method of claim 13 wherein the steps thereof are performed when the determined polygon record represents an intersection polygon.

15. The method of claim 6 wherein the travel information includes heading of the user device.

* * * * *